US007389507B2

(12) United States Patent
Dickson

(10) Patent No.: US 7,389,507 B2
(45) Date of Patent: Jun. 17, 2008

(54) OPERATING-SYSTEM-INDEPENDENT MODULAR PROGRAMMING METHOD FOR ROBUST JUST-IN-TIME RESPONSE TO MULTIPLE ASYNCHRONOUS DATA STREAMS

(75) Inventor: Lawrence John Dickson, La Jolla, CA (US)

(73) Assignee: Tandberg Data Corporation, Boulder, CO (US)

(*) Notice: Subject to any disclaimer, the term of this patent is extended or adjusted under 35 U.S.C. 154(b) by 558 days.

(21) Appl. No.: 10/361,446

(22) Filed: Feb. 10, 2003

(65) Prior Publication Data

US 2004/0158833 A1 Aug. 12, 2004

(51) Int. Cl.
*G06F 9/46* (2006.01)
*G06F 12/00* (2006.01)
(52) U.S. Cl. .................... 718/102; 711/114; 719/325
(58) Field of Classification Search ................ 710/5–7, 710/20, 21, 56; 711/4, 111, 112, 147–149, 711/114; 718/102–104; 719/312–314, 325, 719/326; 709/213–216
See application file for complete search history.

(56) References Cited

U.S. PATENT DOCUMENTS 4,965,718 A * 10/1990 George et al. ............... 718/104

(Continued)

FOREIGN PATENT DOCUMENTS

GB 2 348 303 A 9/2000

OTHER PUBLICATIONS

Australian Patent Office Examination Report and Australian Patent Office Search Report, both dated Feb. 24, 2006, transmitted by the Intellectual Property Office of Singapore on Mar. 28, 2006.

(Continued)

*Primary Examiner*—William Thomson
*Assistant Examiner*—Charles E Anya
(74) *Attorney, Agent, or Firm*—Chen Yoshimura LLP

(57) ABSTRACT

An operating-system-independent modular programming method is disclosed, which includes providing one or more tasks, one or more task queues, and zero or more condition queues. Each task is a program that is run in sequence. Each task queue includes a task queue program and a queue containing zero or more tasks. Each condition queue includes a condition queue program and a queue containing zero or more tasks and associated conditions. Each task includes task ending code that refers to zero, one, or more than one successor task, and the task queue program or the condition queue program handles each such successor task by either running it or placing it in a task queue or a condition queue. The programming method further includes providing a fan and an end fan construct to enable a parent task to generate a plurality of child sequences. These program constructs may be used to form pseudothreads, each pseudothread being a single sequence of control, with interruptions allowed but no concurrency of execution, implemented in an operating system independent way. Also disclosed is an application of this programming method to accomplish robust just-in-time response to multiple asynchronous data streams in a RAID control program. The RAID control program includes a plurality of requesters, a resource allocator, and a plurality of stripe parity and IO masters, and an optional chainer, each being implemented as a pseudothread.

20 Claims, 13 Drawing Sheets

U.S. PATENT DOCUMENTS

| | | | | |
|---|---|---|---|---|
| 4,980,857 | A | * | 12/1990 | Walter et al. ................... 714/45 |
| 5,278,984 | A | * | 1/1994 | Batchelor ................... 719/314 |
| 6,408,277 | B1 | | 6/2002 | Nelken |
| 6,961,720 | B1 | | 11/2005 | Nelken |
| 6,983,462 | B2 | * | 1/2006 | Savov et al. ................ 718/104 |
| 2003/0005025 | A1 | | 1/2003 | Shavit et al. |
| 2003/0014473 | A1 | * | 1/2003 | Ohsawa et al. ............. 709/107 |
| 2003/0182503 | A1 | * | 9/2003 | Leong et al. ................ 711/114 |
| 2004/0107240 | A1 | * | 6/2004 | Zabarski et al. ............ 709/201 |

OTHER PUBLICATIONS

Hoare C A R: "Communicating sequential processes", Communications of the ACM, vol. 21, No. 8, Aug. 1978, pp. 666-677.

Tomonaga S; Yokota H: "An implementation of a highly reliable parallel-disk system using transputers", Transputer/Occam Japan 6. Proceedings of the 6th Transputer/Occam International Conference, 1994, pp. 241-254.

Hilderink G; Broenink J; Bakkers A: "Communicating Treads for Java", Proceedings of the 22hn World Occam and Transputer User Group Technical Meeting, 1999, pp. 243-261, Amsterdam, NL, ISBN: 4-274-90285-4.

Patrick D G; Green P R; York T A: "Occam-and C-based multiprocessor environments for Unix clusters", Computer Journal, vol. 40, No. 1, 1997, pp. 12-21, Oxford, UK.

Debbage M; Hill M; Wykes S; Nicole D: "Southampton's Portable Occam Complier (SPOC)", Proceedings of the 17th World Occam and Transputer User Group Technical Meeting, 1994, pp. 40-55, Amsterdam, NL.

European Examination Report in EP 04250713.7 (European counterpart application), European Patent Office, Aug. 27, 2007.

European Search Report in EP 04250713.7 (European counterpart application), European Patent Office, Nov. 8, 2006.

* cited by examiner

Edge Symbols

Start Program: 1 ~ /61a   N ~ /61b   X ~ /61c

End Program: ////  — 62

Channel: ○ — 63a

Outward: ○> — 63b

Inward: <○ — 63c

Flow of Control

Code Blocks text — 65a text — 65b select — 65c

Communication

OPERATING-SYSTEM-INDEPENDENT MODULAR PROGRAMMING METHOD FOR ROBUST JUST-IN-TIME RESPONSE TO MULTIPLE ASYNCHRONOUS DATA STREAMS

INCORPORATION BY REFERENCE

Incorporated by reference herein is Appendix A, which is submitted on a compact disc and contains computer program listings. The compact disc contains the following files:

Name of file: CHANNEL.C; date of creation: Jan. 17, 2003; size: 15 KB;

Name of file: INTSPACE.C; date of creation: Jan. 17, 2003; size: 8 KB;

Name of file: RNCOMMON.H; date of creation: Jan. 20, 2003; size: 7 KB;

Name of file: SUMMARY.COD; date of creation: Feb. 6, 2003; size: 8 KB;

Name of file: TASKCODE.C; date of creation: Jan. 17, 2003; size: 4 KB;

Name of file: TESTS.C; date of creation: Jan. 17, 2003; size: 4 KB; and

Name of file: TESTS.H; date of creation: Jan. 17, 2003; size: 3 KB.

BACKGROUND OF THE INVENTION

This invention relates to software applications for handling multiple asynchronous data streams. In particular, it relates to an operating-system-independent modular programming method and its application to a storage device controller to accomplish robust just-in-time response to multiple asynchronous data streams.

SUMMARY OF THE INVENTION

In one aspect, the present invention provides a programming method which includes providing one or more tasks, one or more task queues, and zero or more condition queues. Each task is a program that is run in sequence by being branched to from code outside it to its beginning and branching to code outside it after it ends. Each task queue includes a task queue program and a queue containing zero or more tasks; the task queue program removes the tasks from the queue and runs them in order. Each condition queue includes a condition queue program and a queue containing zero or more tasks and associated conditions. The condition queue program determines the validity of the conditions associated with the tasks in order. If the condition is true, the condition queue program removes the task from the condition queue and places the task in a task queue. Each task includes task ending code that refers to zero, one, or more than one successor task, and the task queue program or the condition queue program handles each such successor task by either running it or placing it in a task queue or a condition queue.

The programming method further includes providing a fan construct, which is a portion of a parent task that references one or more child tasks, the fan construct including a parent-global fan end counter and a parent-global fan end task. The parent task either runs the code of each child task or places the child task in a task queue. Each child task references zero or more successor tasks to form a child sequence. For each child, an end fan component is provided in the last task of the child sequence. The end fan component decrements the parent-global fan end counter, and places the parent-global fan end task in a task queue if all child tasks have been completed. The above program constructs may be used to form pseudothreads, each pseudothread being a single sequence of control, with interruptions allowed but no concurrency of execution, implemented in an operating system independent way.

In another aspect, the present invention provides a software program for controlling a RAID, constructed using the above-described programming method, the program having a single or multiple task queues working in synchrony with hardware interrupt code. The RAID core program includes a plurality of requesters, a resource allocator, and a plurality of stripe parity and IO master operation handler loops, each being implemented as a pseudothread. The requesters are started by IO requests from driver calls issued by a user, and places its request in a queue managed by the allocator. The allocator responds to the requesters, the operation handlers, or clock stimuli from a timer to allocate resources and initiate actions. The operation handlers, which may run on separate CPUs, communicate with a plurality of block data devices.

An alternative RAID core program includes a plurality of requesters, a core chainer, a resource allocator, and a plurality of stripe parity and IO master, each being implemented as a pseudothread. This alternative program permits conversion between different RAID algorithms without interrupting user IO capability.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
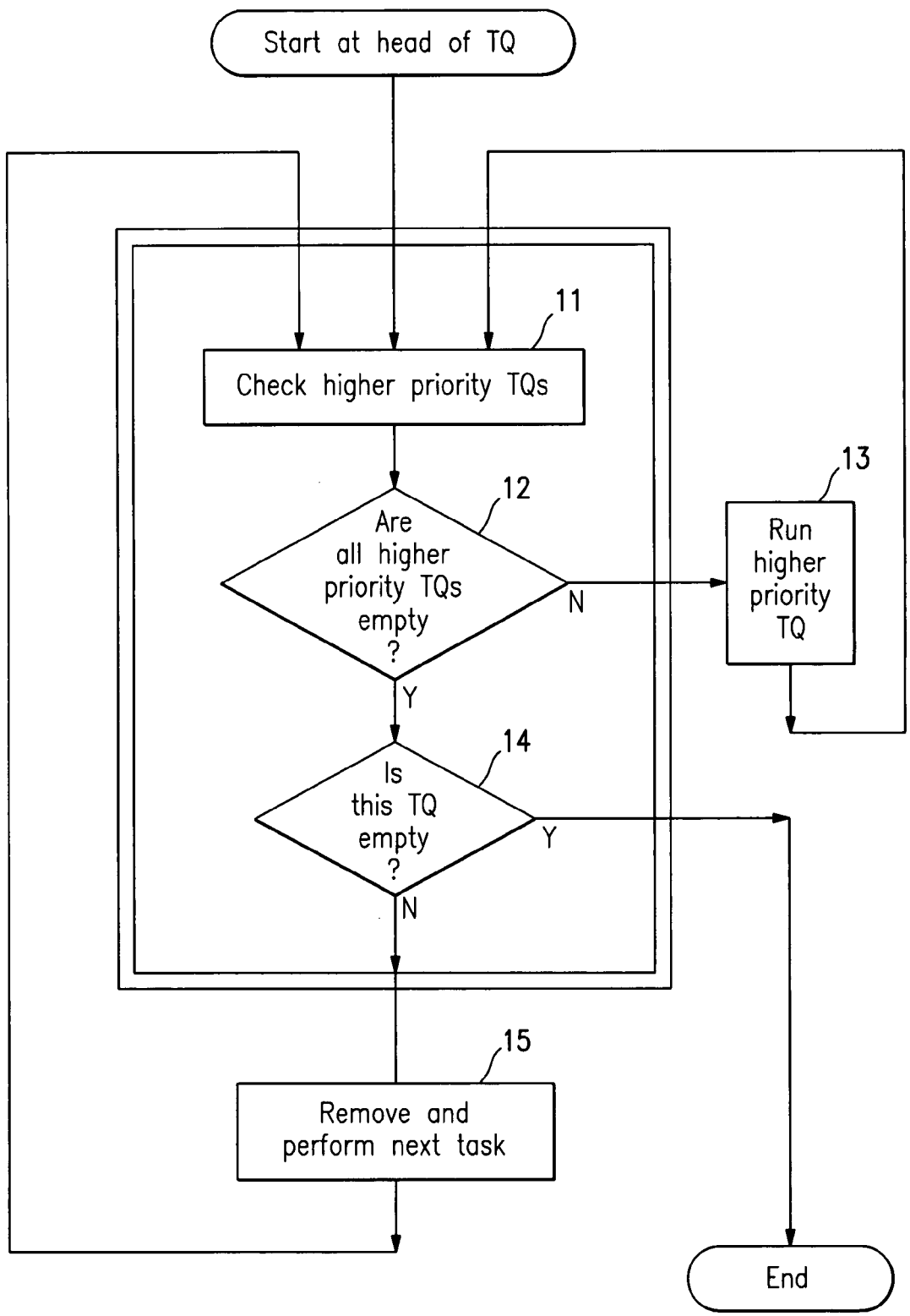
FIG. 1 is a flow diagram illustrating a task queue program.

The present invention relates to an operating-system-independent modular programming method that advantageously accomplishes robust just-in-time response to multiple asynchronous data streams. Although the programming method is described in detail as applied in a storage device controller such as a RAID driver, those skilled in the art will recognize that the method and its principles can be readily applied to other device drivers and other software programs such as robotic sensors, controls, and actuators; complex hardware data backup and printing firmware; asynchronous hardware failure emulators and trace buffers; non-CPU-intensive data switches; and non-intrusive data and statistics gathering modules.

The key component of the operating-system-independent modular programming method is a technique for creating "thread-like" instruction sequences, referred to as "pseudothreads" in this disclosure, independently of any thread structure which the operating system itself may have, or whether the operating system has a thread structure, or even whether there is an operating system. In a conventional operating system, a thread is a flow of execution through a process' code, with its own program counter, system registers, and stack. A thread is started, run, interrupted, resumed and terminated in an operating system dependent way. In a multithreaded operating system, one thread can be running while other thread or threads are in an interrupted state. As will be seen below, a pseudothread according to embodiments of the present invention is a single sequence of control, with interruptions allowed but no concurrency of execution, implemented in an operating system independent way.

The present invention implements and extends the well-known computing paradigm of communicating sequential processes (CSP) and the programming language occam™ which is based on CSP. A description of CSP can be found in C.A.R. Hoare, Communicating Sequential Processes (Prentice-Hall International 1985), which is incorporated by reference herein in its entirety. The occam language, designed to easily describe concurrent processes which communicate via one-way channels, was developed to run on the INMOS transputer. Conventional CSP art has been either confined to a particular hardware platform specifically designed for it (such as the transputer), or has been operating-system-dependent user-space code without just-in-time asynchronous response. On the other hand, conventional thread techniques in non-CSP systems have been operating-system-dependent whether in user space or in kernel space, and have been recognized for their lack of robustness and heavy latency. Conventional program code that responds to external events has been either highly operating-system-dependent, e.g. drivers, which has the disadvantage that they cease to work as the operating system changes; or embedded firmware, which require one program per device, and is unmodular and inflexible. The present invention provides independent modular code, which is reconfigurable and easily testable without losing responsiveness, and is operating-system-independent. Although such code is hardware-dependent, it typically will continue to work through years of upgrades.

The hardware required for supporting programs written according to the present invention includes one or multiple CPUs with standard hardware interrupt capability, standard IO ports, standard resource sharing in the case of multiple CPUs, and a sequencer that can handle at least one task queue (described below). A sequencer is a device on a CPU that, from the CPU state upon completion of an instruction and external stimuli, determines the next instruction to be run. A sequencer may be implemented as a hardware sequencer or a software sequencer. A hardware sequencer performs the following functions. It branches to the unique instruction implied by the previous instruction or instructions as its successor, usually the following instruction, but often an instruction pointed to by a branch or loop; or (mutually exclusively) it branches to an instruction pointed to by a table indexed by a detected hardware interrupt condition forced upon the processor asynchronously from outside. Software sequencing, expressed in assembled or compiled code, builds upon this raw capability, and avoids (or tries to avoid) illegal inputs to the sequencer. These requirements are generally met by most post-1980 microprocessors including standard CPUs and embedded processors, some examples of which include the 80×86 series, including the 8086, and all its successors and clones; the Dec Alpha; the Sparc processors; the specialized embedded processors made by these same manufacturers; the Microchip Technologies PIC embedded processors; and, in general, any processor on which a standard assembler or C compiler can run.

According to embodiments of the present invention, a "task" is a short-lived program that runs in sequence from beginning to end, except for possible interrupts or the possible running of tasks from a higher priority task queue, that can be branched to from code outside it to its beginning, and that can branch to code outside it after it ends. Running a task refers to branching to the beginning of a task, running its instructions in sequence, and branching to proper code outside it after it ends. A "task queue" (TQ) is a program and a queue of tasks with the following properties: (a) The TQ program can be branched to from code outside it to its beginning, and can branch to code outside it if and when it ends; (b) as long as there are tasks in the queue, the program runs the first task in the queue, and then removes the task from the queue; (c) the program ends when there are no tasks in the queue; and (d) tasks may be added to the end of the queue only, and may be added by interrupts, by running tasks, by external code, or other suitable methods.

Relevant to (a) above, "task idle code" refer to code outside a task queue, tasks, or interrupts, which branches promptly to the task queue when the task queue is nonempty and not running, and to which the task queue branches when it ends. Examples of task idle code include operating system and program code, an idle loop in an embedded processor, and a communication loop (such as network or SCSI target code) in firmware on an embedded processor with or without a real-time operating system (RTOS). Relevant to (d) above, a "predecessor task" is a task previously run that references another task in its task ending code ("task ending code" refers to code that is run last in a task before returning control to the task queue); and a "successor task" is a task referenced in the task ending code of the predecessor task. For example, the task ending code of a predecessor task may cause a successor task to be added to a particular task queue. When multiple task queues are present, they may be assigned relative priorities. In this situation, in the above step (b), the TQ program runs the first task in the queue only if no other nonempty higher priority task queues are present.

FIG. 1 illustrates a task queue program. In FIG. 1 as well as subsequent figures, a double border is used to indicate that the code sequence enclosed therein is atomic, meaning that the code sequence is uninterruptible and is in sole possession of resources (e.g. variables) with no resource sharing with other code, including, in the multiprocessing case, code running on other CPUs. In embodiments of the present invention various portions of the code are preferably atomic to ensure the proper functioning and the robustness of the program. For example, the task ending code of a predecessor task is typically atomic. In all following discussion, code "with interrupts disabled" will mean atomic code.

The task queue program shown in FIG. 1 includes nesting of higher priority task queues. Generally, multiple task queues may be present and may be given different priorities. Nesting is accomplished by providing a step in the TQ program for checking higher priority TQs to determine whether any higher priority TQ is non-empty (steps 11, 12). If a higher priority TQ is non-empty (N in step 12), then the higher priority TQ is run (step 13). If all higher priority TQs are empty (Y in step 12), the program determines whether the current TQ is empty (step 14). If the current TQ is not empty (N in step 14), the program performs the next task in the queue and removes it from the queue (step 15). The program ends if the current TQ is empty (Y in step 14). Alternatively, a task queue may be provided without the nesting of higher priority task queues, in which case steps 12 and 13 are omitted. In the example shown in FIG. 1, steps 11, 12 and 14 are atomic as indicated by the double border, while step 13 (Run higher priority TQ) and step 15 (Remove and perform next task) are not required to be a part of the atomic code.

Alternatively, a task queue may be implemented such that a higher priority task queue can run after a lower priority task has started and before it has ended, either cooperatively or preemptively, according to the implementation, as long as such running does not interrupt an atomic code block. This implementation may be illustrated by the same flow diagram as shown in FIG. 1 except that step 15 is modified to allow the running of higher priority task queues.

Multiple task queues may also run on separate CPUs. In this case, they may run independently and concurrently as long as any resource shared by two or more of them is read-only to all of them, and until they are forced to synchronize by a communication or condition queue operation (described below).

Figure 2:
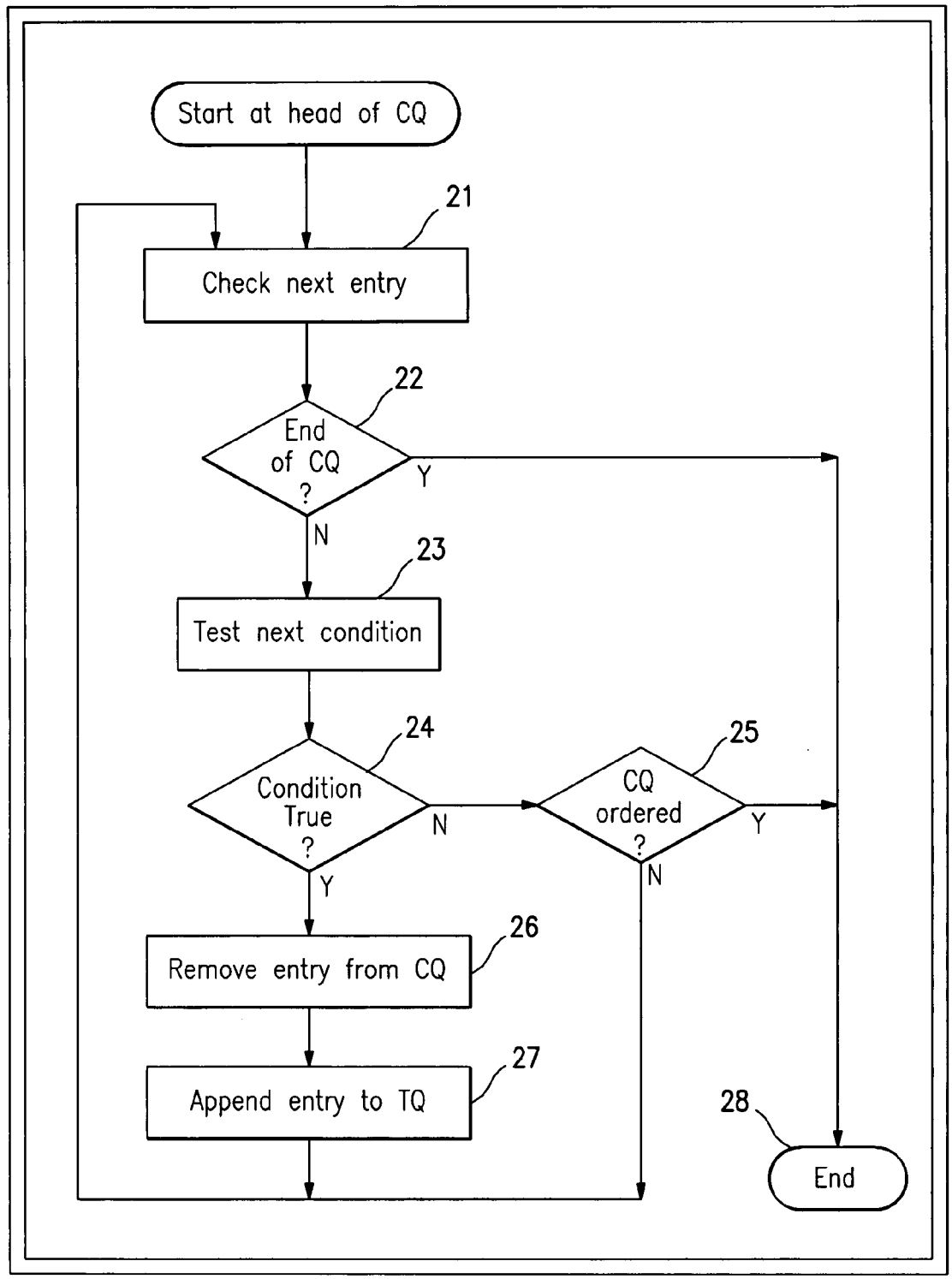
FIG. 2 is a flow diagram illustrating a condition queue program.

A "condition queue" (CQ) is a program and a queue of tasks and associated conditions. Each queue, except for the specialized short ones maintained by communication channels and alternations (described later), contains a sequence of entries implemented as condition structures. Each entry contains a code block and a test procedure, which test is known to have been false when the entry was attached to the queue, and which can only change from false to true and not from true to false during the lifetime of the entry. At appropriate times, whenever the validity of the test may have changed, the test procedure is run atomically and if it is found true, its code is placed on a task queue. The running of the test may also change other state, as with a semaphore. The CQ program can be run anywhere, including within an interrupt. The general flow of the CQ program is described with reference to FIG. 2.(a) If the condition queue is not empty (N in step 22), the program checks the validity of the condition associated with each task in the order of the tasks in the condition queue (step 23). (b) If it finds a condition true (Y in step 24), it removes the corresponding entry from the condition queue (step 26) and performs appropriate state adjustments, which may include appending the task to the end of an appropriate task queue (step 27). If the CQ implements a specialized communication procedure such as the alternation, or CSP select, this step may involve (not shown in FIG. 2) placing the task back on a condition queue instead of a task queue, but this is always accompanied by an advance of state leading to a final state placing the task on a task queue. (c) If the program finds a condition false (N in step 24), it either exits (step 28) if the CQ is ordered (Y in step 25), or checks the next task (step 21) until all tasks are checked if the CQ is non-ordered (N in step 25). (d) Entries (tasks and corresponding conditions) may be added to the condition queue only by task ending code of a predecessor task with interrupts disabled. Typically, entries are added to the end of the condition queue, but in some cases such as timer queues (a queue of time-outs), entries may be added anywhere within the condition queue. Preferably, the entire CQ program in this example is atomic code as indicated by the double border in FIG. 2. Also, as illustrated in the figure, a condition queue may be ordered or not ordered (step 25).

Relevant to (d) above, a "condition branch" is a condition and a successor task referenced in the task ending code of a predecessor task (with interrupts disabled). When the task ending code of the predecessor is run, the successor task is run or added unconditionally onto a task queue if the condition is true, or added to a condition queue if the condition is false. The condition may be trivial, i.e., always true; thus, a condition branch includes the unconditional branch to a successor task.

The queues in a TQ or CQ can be implemented by any suitable programming structure.

Further according to embodiments of the present invention, a "fan" construct refers to a set of zero or more "child tasks" referenced in the task ending code of a "parent" predecessor, together with a parent-global fan counter numbering the child tasks, a parent-global fan end counter and a parent-global fan end task. Each child task may then reference a sequence of zero or more successor tasks forming a child sequence (or simply referred to as a "child"). At the end of each child sequence, an "end fan" component is provided, which runs with interrupts disabled to decrement the parent's fan end counter, and to load the parent's fan end task to a task queue if the counter goes to zero. The parent's fan end task resumes the parent code sequence. By this construction, each fan has a well-defined termination condition leading to the orderly resumption of the parent. Fans may be nested, that is, a child in a fan may be a parent that generates another fan. The use of the fan construct is required when there is more than one successor task to a parent task.

Figure 3:
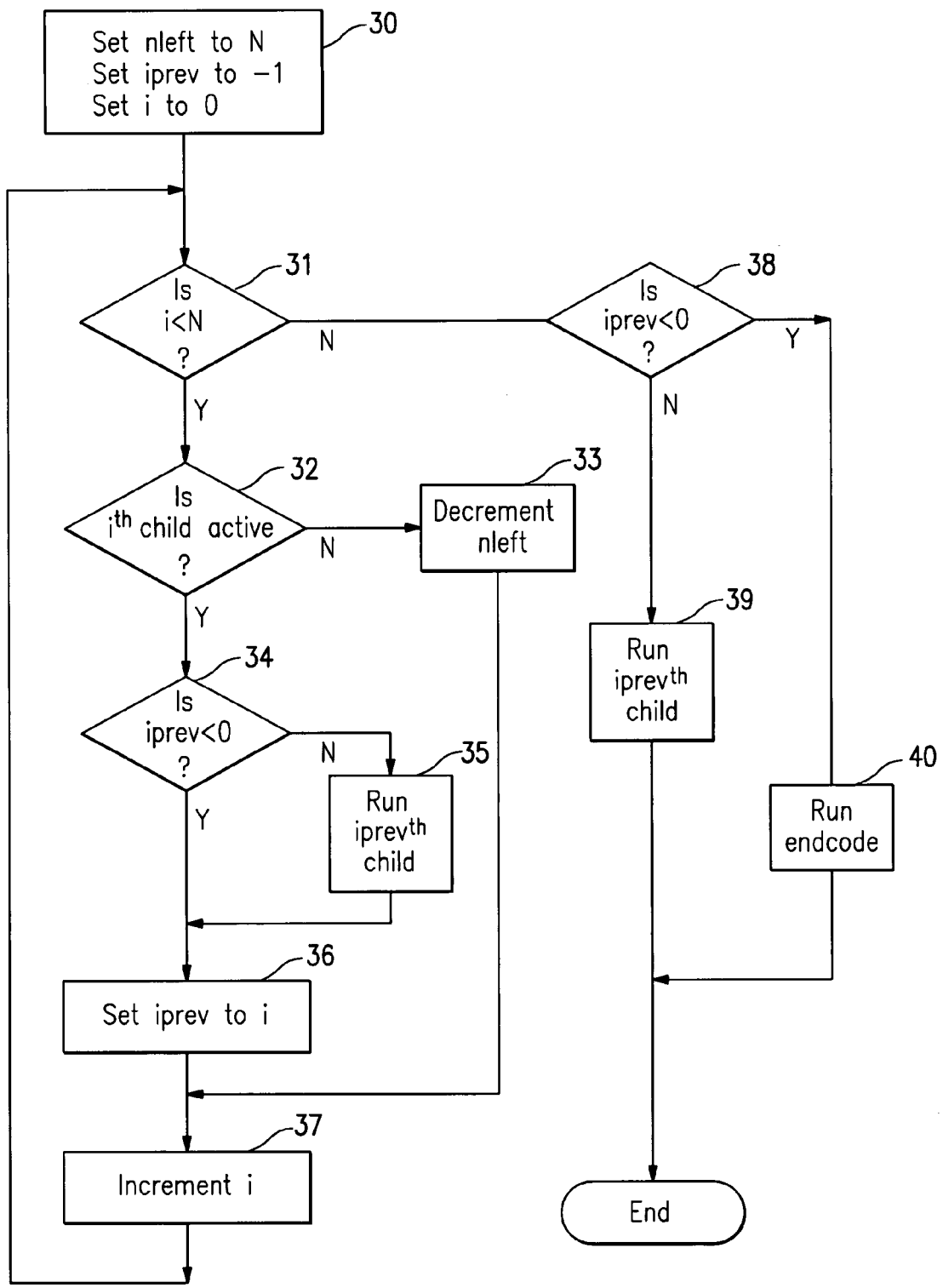
FIG. 3 is a flow diagram illustrating a fan construct.
Figure 4:
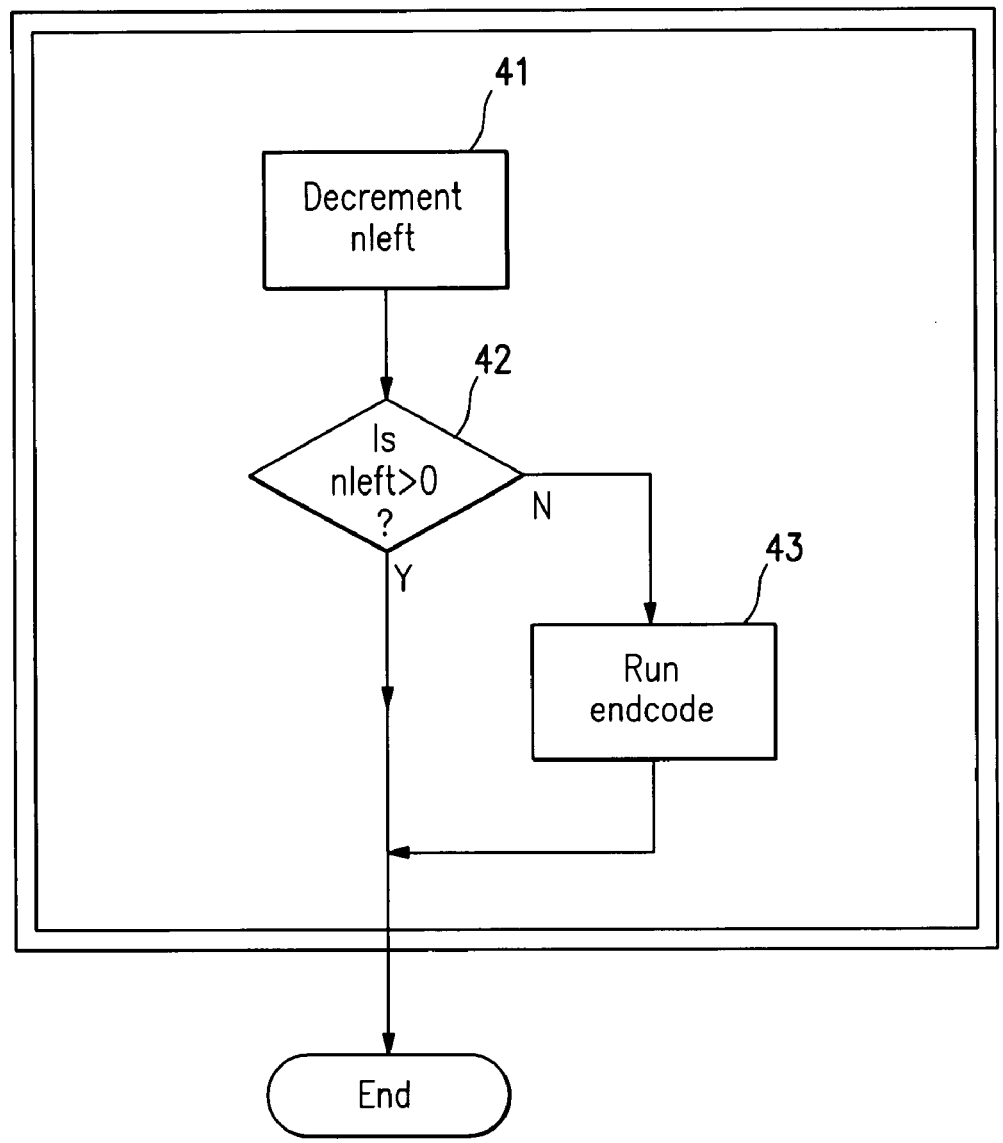
FIG. 4 is a flow diagram illustrating an end fan construct.

FIG. 3 illustrates a fan construct, where a parent task branches into child sequences' with parent code sequence resuming at "endcode" (the parent-global fan end task). FIG. 4 illustrates an end fan construct, i.e. the code that is run at the end of each child sequence. In this example, N child tasks are specified in the parent. The variable "i" is the parent-global fan counter that numbers the children, and the variable "nleft" is the fan end counter that indicates the number of children that remain to be completed. The parent program tests each child to determine if it is active. Active child tasks (Y in step 32) are run (steps 35 and 39, "RUN iprev-th child") while inactive child tasks (N in step 32) are ignored (step 33). In this particular embodiment, the children are specified in the parent as a loop of N tries of which any can be canceled (made inactive) by a FALSE in a pre-existing Boolean array of N elements. Alternatively, the children can simply be specified as an array (i.e. all children are active), in which case steps 32 and 33 can be omitted.

In the "Run iprev-th child" steps (steps 35 and 39), a child may run to completion within the "Run iprev-th child" step; that is, the "end fan" construct (shown in FIG. 4) is run within "Run iprev-th child". Or, a child task may run to its end in "Run iprev-th child", but instead of running the end fan construct, it generates a successor (or, through a nested fan, successors). The successor may in turn generate successor(s), and the final task in such a sequence must contain the end fan construct. As a result, a plurality of child sequences may exist concurrently. In an alternative implementation, the "Run iprev-th child" step only places the child task in a task queue without running its code. In this case all children will be run by the task queue(s). In yet another alternative implementation, the "Run iprev-th child" step in the parent program may be designed to run the entire child sequence to completion. All of the above alternatives are covered by FIG. 3, and the word "Run" in steps 35 and 39 should be given a broad meaning not limited to running the code of the child task.

The execution of the parent endcode by a child is determined by the parent's fan end counter nleft. nleft is initially set to N (step 30 in FIG. 3) and is decremented by the end fan component of each child sequence when it completes (step 41 in FIG. 4), or by the parent if a child is not active (i.e. not run; step 33 in FIG. 3). The "Run endcode" step in the end fan component of a child (step 43 in FIG. 4), which runs the endcode of the parent to resume the parent code sequence, is performed by a child only when the parent's fan end counter nleft is 0 (N in step 42 of FIG. 4), i.e., when that child is the last to complete. The parent program (FIG. 3) also includes a "Run endcode" step (step 40), which runs the parent's endcode to resume the parent code sequence in the case that none of the N children is active (N in step 31 and Y in step 38).

It can be seen that by using "iprev", the parent runs the previous active child of the current active child (the child determined active in step 32). The purpose of this is so that the parent program, if it does not complete all children within the parent loop, can fall through to the last active child, so that the last active child may be viewed as the successor of the parent. Then final "Run iprev-th child" step (step 39) runs the last active child. If all active children are completed in the parent loop, then the last child will find nleft==0 when it runs step 42 of its end fan construct (FIG. 4). As a result, the parent's endcode will be run by the last child. The program flow shown in FIG. 3, especially the ways the variables nleft, iprev and i are set and incremented/decremented, are exemplary only. Any other appropriate program flow may be implemented, so long as the children are initiated by the parent and the parent endcode is run when all children are completed.

In an end fan construct shown in FIG. 4, the code portion including step 41 ("Decrement nleft"), step 42 ("Is nleft>0?"), and step 43 ("Run endcode") is shown to be atomic. Alternatively, the "Run endcode" step (step 43) may be outside of the atomic block, as long as the test step (step 42) is atomic with the decrement step (step 41). The fan construct shown in FIG. 3 is not required to be atomic, except for the "decrement nleft" step (step 33). Thus, the parent program may be interrupted, for example, by a child task that has been placed in a TQ if the child has a higher priority. In the implementation where the "Run iprev-th child" step places the child in a TQ without running the child's code, the "Run iprev-th child" step is atomic.

The above described program constructs may be used to form pseudothreads. A "pseudothread" is a sequence of predecessor-successor tasks, starting with a task either loaded onto the task queue by independent external code, or as a child task in a fan, continuing in sequence through either the successor task of a condition or unconditional branch or from a fan to the fan end task of the fan (not including the child sequences), and ending when a task terminates without a condition or unconditional branch, a successor, or a fan. Each pseudothread is a single sequence of control, with interruptions allowed but no concurrency. A fan and a corresponding end fan component may operate to form a plurality of pseudothreads existing concurrently. Point-to-point communication between pseudothreads, including selection, is done with specialized short condition queues, executed within the communicating pseudothreads themselves.

While such a comparison is not intended to be limiting on the scope of the present invention, those familiar with CSP (occam) will recognize that the pseudothread may be used to implement the CSP construct of a Process, and the fan and end fan construct may be used to implement the CSP PAR construct. In addition, the standard CSP communication and control constructs such as Channels, Timer-queues, and Alternations may be implemented by specialized condition queues. Condition queues also implement further constructs such as Semaphores and separate CPU hardware parallelism.

In a multiple-CPU environment, there is no requirement that separate CPUs be identical (i.e. SMP (symmetric multi-processing) is not required).

As an example, an alternation and an unconditional channel as they relate to the channel (a one-entry "condition queue" used for communication) may be implemented as follows. Unconditional communication may occur between two pseudothreads A and B via a condition queue c (a channel) in a symmetrical fashion. The condition queue c holds a single workspace pointer which is either a workspace address or is NULL, where a workspace structure points to a task and contains other state and communication parameters. The condition consists of a test of whether the pointer is nonNULL. Pseudothread A (or B) checks the channel c, if it finds c NULL, it writes its successor task into the channel (i.e. places the workspace pointer for its successor task in the condition queue) and unconditionally exits. If it finds c nonNULL, it performs the communication, writes the task found in the channel (belonging to the other pseudothread) into the task queue, and either continues or puts its own successor into the task queue and exits.

An alternation involves an alternation pseudothread A (the one selecting) and an outputting pseudothread B and a channel c (a condition queue). When A tries to select c, A checks the condition (the workspace pointer) in c. One possibility (Scenario 1) is that A finds the channel c NULL (channel empty), in which case A writes its successor task into c and unconditionally exits. Subsequently, when B checks c, B will find A in c, and find that it is an alternation. In this case B advances the state of A to "ready" and writes itself (B) in c, places A on the task queue if it is not already there, and unconditionally exits. Another possibility (Scenario 2) is that when A tries to select c and checks the condition in c, A finds B in c (either as a result of a channel output attempt by B or as a result of the second step of a previous Scenario 1 where c did not win the selection afterward). In this case A advances its own state to "ready", leaves c unchanged, and if its successor is not already on the task queue, it continues to its successor (or places its successor on the task queue and exits). Scenario 1 happens only once, if at all, but Scenario 2 may happen many times, if something other than c keeps winning the selection. Each scenario leaves the alternation in "ready" and is therefore followed by a select, of which if the winner is c, the channel transmission takes place exactly as in an unconditional transmission, with B always the first ready to transmit. Alternation based on a condition queue, such as a timer queue, requires that the task be removed from the condition queue after the alternation comes ready for any reason. The above description implements well known CSP/occam constructs.

The principles and general structure of an operating-system-independent modular programming method have been described. Another aspect of the present invention is a program for controlling a hardware device, constructed using the above-described programming method, the program having a single or multiple task queues working in synchrony with hardware interrupt code. This program can coexist with any operating system capable of yielding control to such a task queue and interrupts, and later receiving control back. Operating systems with such capabilities include most standard operating systems including RTOS's. The program can also operate on a processor that does not have an operating system; all that is required is task idle code that is capable of starting a pseudothread. Such a program may be constructed using the modular programming method described above by populating the task queue(s) with tasks in such a fashion that the tasks are organized in pseudothreads with robust and predictable properties (e.g. according to the CSP computing paradigm), communicating with each other and with asynchronous data streams in a just-in-time fashion, and performing calculations as soon as data becomes available, but with a lower priority than the IO response so as to avoid excessive latency. All resource allocation may be controlled according to CSP rules, so that a child process owns only resources that were owned by its parent, and may not share with siblings any resources other than read-only resources. Resource validity is communicated in a just-in-time fashion by the condition queues. Hardware communication Links and Events are implemented by condition queues within interrupts. For example, a link, or point-to-point communication with an asynchronous IO device with flow control, may be implemented by a single half-channel and device ready. An event, in the sense used by CSP implementers, may be handled by a condition queue under control of the eventing device's interrupt code. Multiple task queues can implement low priority and separate CPU hardware parallelism, with no operating system support. Latency is kept as low as possible, and completely and simply controlled, by the interrupt-based queuing of tasks and the priority control on the queues.

It is noted that based on the descriptions of embodiments of the present invention including the task queue and condition queue manipulation, as well as the examples described below, those skilled in the relevant field of CSP implementation will be able to carry out various state machines of a storage device controller.

As a specific example of a storage device controller, a generic software core for a RAID application constructed using the operating-system-independent modular programming method is described now. RAID (redundant array of inexpensive disks) is a storage system that may be used to increase disk reliability. Several different types of RAID system have been defined: RAID-0, RAID-1, RAID-2, RAID-3, RAID-4, and RAID-5. In a further RAID system, the number of redundant devices (i.e. the level of data redundancy) can be made selectable using a technique known as Wiencko codes, described in commonly assigned U.S. patent application Ser. No. 09/366,222, filed Aug. 2, 1999, now allowed. A generic RAID application according to embodiments of the present invention is a driver for a RAID storage system that supports one or more RAID levels and supports multiple selectable data redundancy when appropriate. The driver interacts with the storage devices and is able to provide just-in-time response to multiple asynchronous data streams. One particular application of the RAID software core is a NAS (Network Attached Storage) device that includes a plurality of disk drives with a server and control software that can execute data I/O requests from other network servers.

To facilitate the description of the RAID implementations, some RAID terminology is discussed below. The discussion of terminology is illustrative only and is not intended to limit the scope of the present invention in any respect.

A "block" is a sequence of data in a larger address space, of a predetermined length, and offset from the start of the address space by an integer multiple of that length. The length is typically a power of two multiple of a byte, greater than or equal to 512 bytes, and the address space is the linear address space of an input-output (IO) device like a disk or tape, or a subset of that device such as a disk partition. A "block device" is an IO device that can receive or transmit data only by blocks of a certain minimum size, called the "hardware block size". Typically this minimum size is a power of two multiple of a byte, 512 bytes or greater. When referring to a block device, the term "block" or "software block" is always taken to refer to an integer multiple of the hardware block size. A "chunk" is an alternative block definition, often used to emphasize a block size that may be greater than that of the hardware or software block size. RAID operations are performed on chunks or sets of chunks. A "virtual address space" (of a RAID or other compound block device) is a block-organized address space within which IO can be transmitted to or from the compound device, appearing from outside the compound device as if it were linearly organized block IO on a single device. The data is in fact distributed among several underlying devices, and may generate other "invisible" data, called "parity", which can be used for recovery if an underlying device or devices become unavailable. In this sense, "parity" is a general term including the mirrored data of a RAID1 or RAID10. A "stripe" is a contiguous set of chunks in a virtual address space (the "virtual stripe"), corresponding to a chunk or set of chunks of data and/or parity on each of a set of underlying devices (the "real stripe"). The data on the virtual stripe determines, and is determined by, the data and parity on the real stripe, to the exclusion of anything outside either stripe, and the stripe is chosen to be the smallest contiguous unit possible for which this can be said. The stripe size and organization is dependent on which RAID algorithm is being used.

Figure 5:
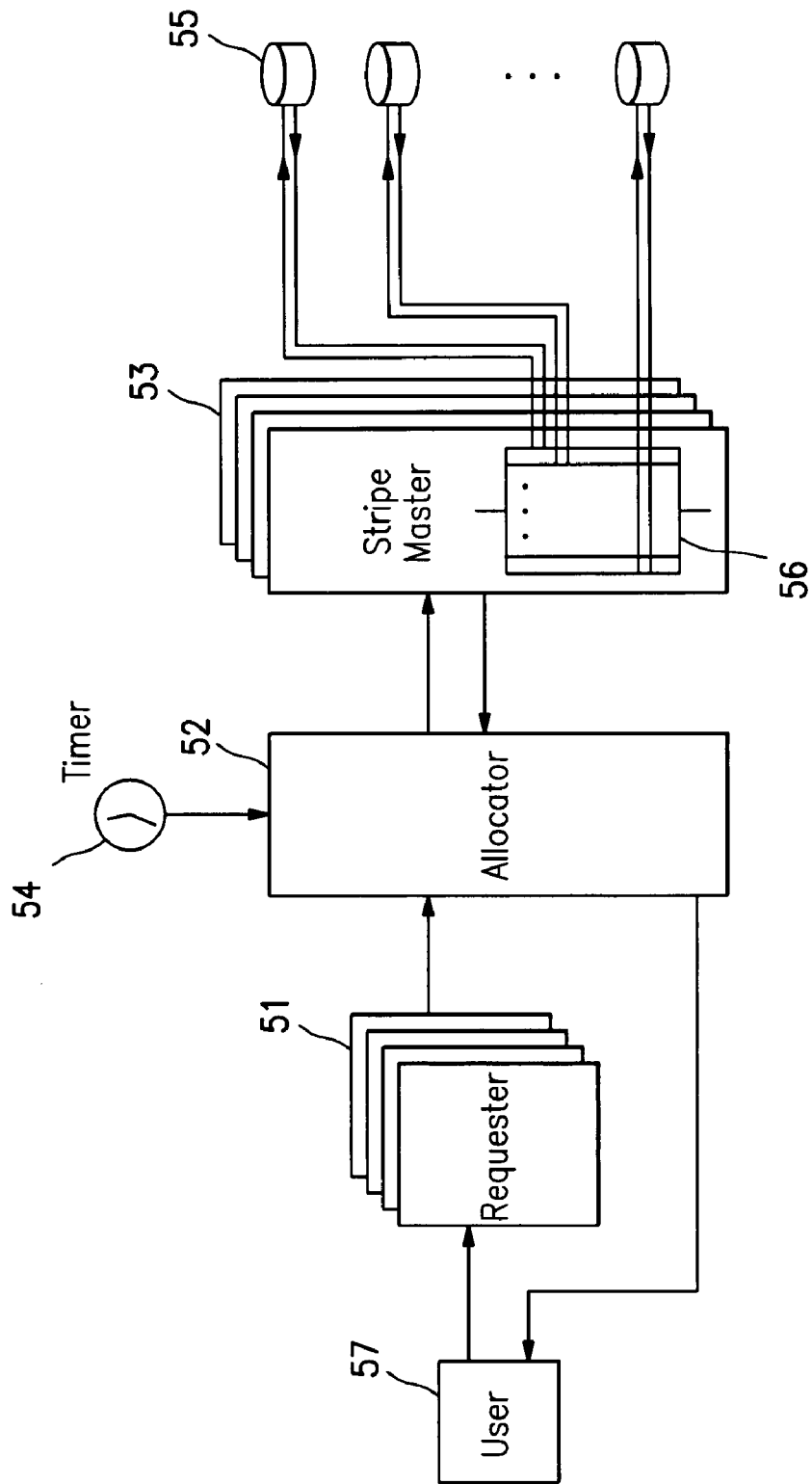
FIG. 5 illustrates the structure of a software core for controlling a RAID according to one embodiment of the present invention.

FIG. 5 illustrates the overall construction of a RAID software core according to an embodiment of the present invention. The RAID core monitors the state of a RAID array or multiple RAID arrays, allocates resources to the constituent operations of the RAID array(s), accepts requests for input and output from the user(s) of the RAID array(s), and responds to completion or failure signals from the constituent operations by transmitting correct state and data to the user (s). The core includes a plurality of requesters 51, a resource allocator 52, and a plurality of stripe parity and IO masters (stripe masters) 53. Each of these components is implemented as a pseudothread. The requesters are short-lived pseudothreads which are started (spawned) by IO requests from driver calls issued by a user or users 57. The construction allows the driver calls to treat the entire software core as if it were a block data device. The allocator 52 is a single long-lived pseudothread that responds to the requesters 51, the stripe masters 53, or clock stimuli from a timer 54 to allocate resources and initiate actions. The stripe masters 53 are also long-lived pseudothreads each communicating with a plurality of block data devices 55 (such as disks). The plurality of block devices may constitute one or more RAID arrays. In addition, an underlying device 55 may be a RAID core, which results in nested RAIDs. In the case of a nested RAID, the user 57 is a stripe master of a higher level RAID. For convenience, this disclosure uses the term "disk" to refer to the underlying device. When so used, the term "disk" should be understood to mean any suitable storage device and should not be limited to disks. Similarly, the term "user" should be understood to refer to any processes, threads or pseudothreads external to the RAID core that issue the requests.

Each requester 51 is spawned by an external process, thread or pseudothread, when the required resources are allocated. The creation of a requester 51 occurs in the user code, after waiting if necessary for its little memory workspace to be dynamically allocated, and completes with the placing of the request, with information on how to wake its user process, in a task queue, followed by the user process sleeping. The request queue is a circular queue managed by the allocator 52. The requester 51 may live only long enough to place its request in the request queue, though its request may have to be maintained in memory longer, if it contains information necessary to permit data 10 to the underlying devices without superfluous copying.

The allocator 52 is "waked" by communication from a requester 51 or a stripe master 53 or by clock ticks from the timer 54. The allocator 52 is triggered by the CSP/occam "Alternation" construct, and exhaustively tests resource state before directing the many concurrent pseudothreads of other types: This single-threaded control of all resources is a critical feature of the invention, allowing just-in-time parallelism and response while provably avoiding race conditions. Each request from a requester 51 is assumed to be wholly contained within a single virtual stripe, and each communication from a stripe master 53 represents the completion of some operation or operations upon a single stripe. The allocator 52 is therefore always notified when it has a job to do or a job complete, and is given access to all information about caches, data validity, watermarks, memory pool availability, disk failures, RAID creation, rebuilding, or destruction, algorithm requirements, and other variables which enable those skilled in the art of RAID software coding to fully update every state machine and resource allocation needed for the next step or steps in the RAID's operation.

The above allocation function is done at high priority without delay. The allocator 52 then may assign to an available stripe master 53 the time-consuming or delay-prone operations of parity calculation and/or underlying device IO. This is done with a channel output to that stripe master 53, which will be heard from again by the allocator 52 only when the required operation is done or has failed.

The stripe master 53 is waked by task assignments from the allocator 52, and can spawn a plurality of parallel pseudothreads 56 using the "fan" and "end fan" constructs described earlier. Each of these pseudothreads 56 is dedicated to one of the underlying block data devices 55. Each of the pseudothreads 56 sleeps on IO and wakes (and terminates) when IO and data manipulation are done. The "fan" and "end fan" constructs are critical components of each stripe master 53, guaranteeing correct and robust behavior of underlying mass storage devices controlled by the RAID, including just-in-time response to their unpredictable and different asynchronous behavior. The stripe masters 53 may also, preferably at a lower priority, perform parity calculation on the data sent or received by this IO. Thus, each stripe master performs such parity creation or use operations and block device input and output operations as are necessary to read or write user data with all correct parity data from or to the RAID array(s). The stripe masters may run on separate CPUs.

Each underlying device (disk) 55 independently responds to the demands made on it by the stripe master 53. Disks operate more optimally when they handle multiple IO tasks at once. One example is reading long sequences of data one after another from the disks. Read ahead allows the disks to operate without stopping, and thus to produce data much faster. Another example is a server (such as an e-mail server) where a large number of users access the disks at essentially random locations. If dozens of such access requests are handled together, the requests can be ordered so as to seek through the disks in a certain order, e.g. from the inner diameter to the outer diameter of the disks and back, rather than bouncing randomly across the disk. This is sometimes called an elevator algorithm. One purpose of multiple stripe master design according to embodiments of the present invention is to support read ahead and elevator algorithms. For example, sixty-four stripe masters may communicate with the same disk. This is accomplished by using a commit condition queue for each disk. The commit condition queue allows the disk driver to take requests from multiple stripe masters, order them and handle them in an optimal way. Once a stripe master's demands on a disk are committed, and without reference to whatever request queuing, unplugging or elevator operations the underlying disk driver may perform, a second condition queue, the disk done condition queue, wakes up the stripe master only when all parts of these demands are completed or failed.

Since all of the above components are implemented as pseudothreads, priority of the various tasks may be controlled by providing different CPUs to house different pseudothreads. For example, one or more "math" CPUs that efficiently perform parity calculations may be provided to house the low-priority pseudothreads of these calculation tasks of the stripe-masters, while a separate "controller" CPU responding to interrupts from disks and dynamic users may house the allocator, the requesters, and the high priority disk-sensitive pseudothreads of the stripe-masters. The strongly distributed usage of resources required under CSP makes it possible for multi-processing to operate with a minimum of spinlock waits and overhead, and without use of slow and unpredictable operating-system-dependent SMP (symmetric multi-processing) support.

The interface between the operating-system-independent design of the RAID core and the particulars of a given device, or protocol, or operating system, are defined through "callins" by which the operating system drivers trigger and act upon the RAID core, and well-defined "callouts" which are called by the RAID core and must be satisfied by the operating system. The callouts include at least those callouts required by the pseudothreads themselves, exemplified in the sample code included in Appendix A contained on a compact disc that has been incorporated by reference. The callouts may also include standard RAID resource providers, such as dynamic memory, hashing and resource allocation support, RAID-specific queue handling, and informational calls such as disk partition size descriptions. These are known to those skilled in the art of RAID coding. The callins include informational calls giving RAID state, setup calls that initialize and trigger the pseudothreads, and RAID array manipulation calls that create, rebuild and destroy RAID arrays. They may also conveniently include low-level bit manipulation calls that can be called from underlying interrupt service routines to signal disk done and/or failed, and calling the appropriate condition queues. These are also straightforward to those skilled in the art of RAID and device driver coding, in light of the specialized requirements described in embodiments of the present invention. Callins should be used with caution, especially those that change state, so as not to introduce race conditions by violation of the CSP principles.

The requesters 51, with an associated dynamic memory allocation requirement, carry requirements from unlimited numbers of threads or pseudothreads of IO users to the software core, without permitting the possibility of resource overflow (i.e. memory overflow), and giving the overlying code, outside the invention, an opportunity to "sleep" till resources become available. Since the requester's memory cannot be reused until the requester, and other pseudothreads possibly receiving it from the requester, release it through a callout, the callout mechanism prevents RAID core overflow, no matter how many user processes may be attempting IO, and in fact leaves the external code in control at all times of the resources in use by all the RAID core's pseudothreads.

FIGS. 6-9 schematically illustrate various program components of the RAID core software. All of the program components are implemented in pseudothreads. FIGS. 6(*a*) and 6(*b*) are a legend for the program flow diagrams in FIGS. 7-9, 11 and 12. Symbols 61*a*, 61*b* and 61*c* represent the start of a program, where one copy (61*a*), a fixed set of copies (61*b*), or dynamically produced copies (61*c*) of the program are being started. Symbol 62 represents the end of a program. Symbol 63a represents a channel to or from edge. Symbol 63b (with an arrow pointing outward from the center of the flow diagram to the edge) represents a condition queue or an external wakeup handler. Here "external wakeup" may include process wakeup in any form including operating system or kernel threads or other pseudothreads. Symbol 63c (with an arrow pointing inward to the center of the flow diagram) represents an externally driven condition queue or timer wait. Symbols 63a, 63b and 63c are edge symbols that may be used to connect different flow diagrams. Symbol 64a represents the direction of flow of control in a single pseudothread. Multiple flows from the same point indicate branching. When no flow is shown in a flow diagram, flow is downward. Symbol 64b represents a fan construct (i.e. one pseudothread spawning many child pseudothreads), and symbol 64c represents an end fan construct (child pseudothreads reuniting). A fan implies a fixed set of copies of a program shown once on the diagram. Symbols 65a, 65b and 65c represent code blocks. Symbol 65a represents a task or sequence of tasks without blocking. Symbol 65b represents wait, branch, selection, or pass, where blocking is allowed. Symbol 65c represents a selection among zero or more condition queues or external wakeup control handler (see symbol 66a below) executed without blocking. Here blocking refers to a state in which the program waits for external stimuli before it performs further actions. Symbols 66a-66g represent various forms of communication. Symbol 66a represents a condition queue or an external wakeup control handler. Symbol 66b represents a condition queue wait. Symbol 66c represents an input channel wait. Symbol 66d represents an output channel wait. Symbol 66e represents an alternation condition (timer) select. Symbol 66f represents-an alternation channel (input) select. Symbol 66g represents an output channel to alternation and end program. Communication 66a is non-waiting and communications 66b-66g allow waiting. In an alternation, the channel select is separate from the channel input (see the explanation of steps 803, 804, 805 and 806 below). Alternation paths can be deactivated by Booleans.

Figure 6B:
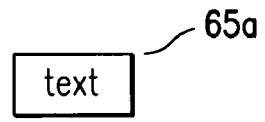
FIGS. 6(*a*) and 6(*b*) are a legend illustrating the symbols used in FIGS. 7-9, 11 and 12.
Figure 6B:
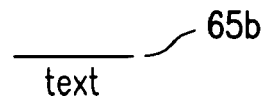
Figure 6B:
Figure 6B:
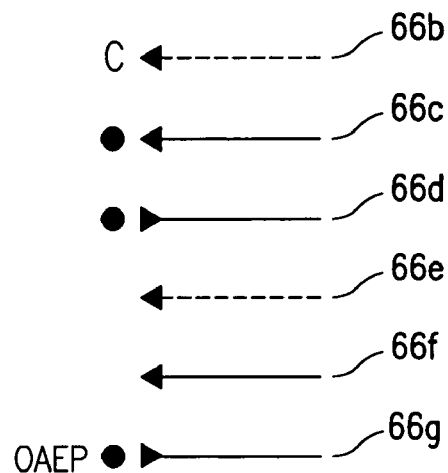
Figure 7:
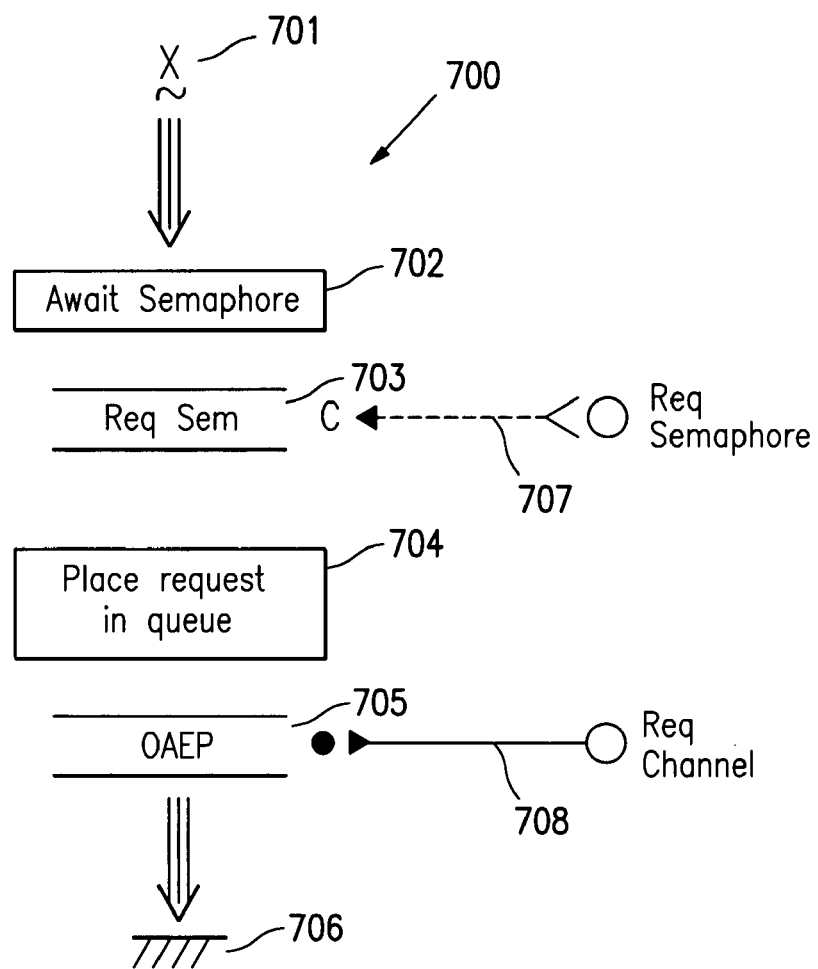
FIG. 7 is a flow diagram illustrating a requester in the embodiment of FIG. 5.
Figure 8:
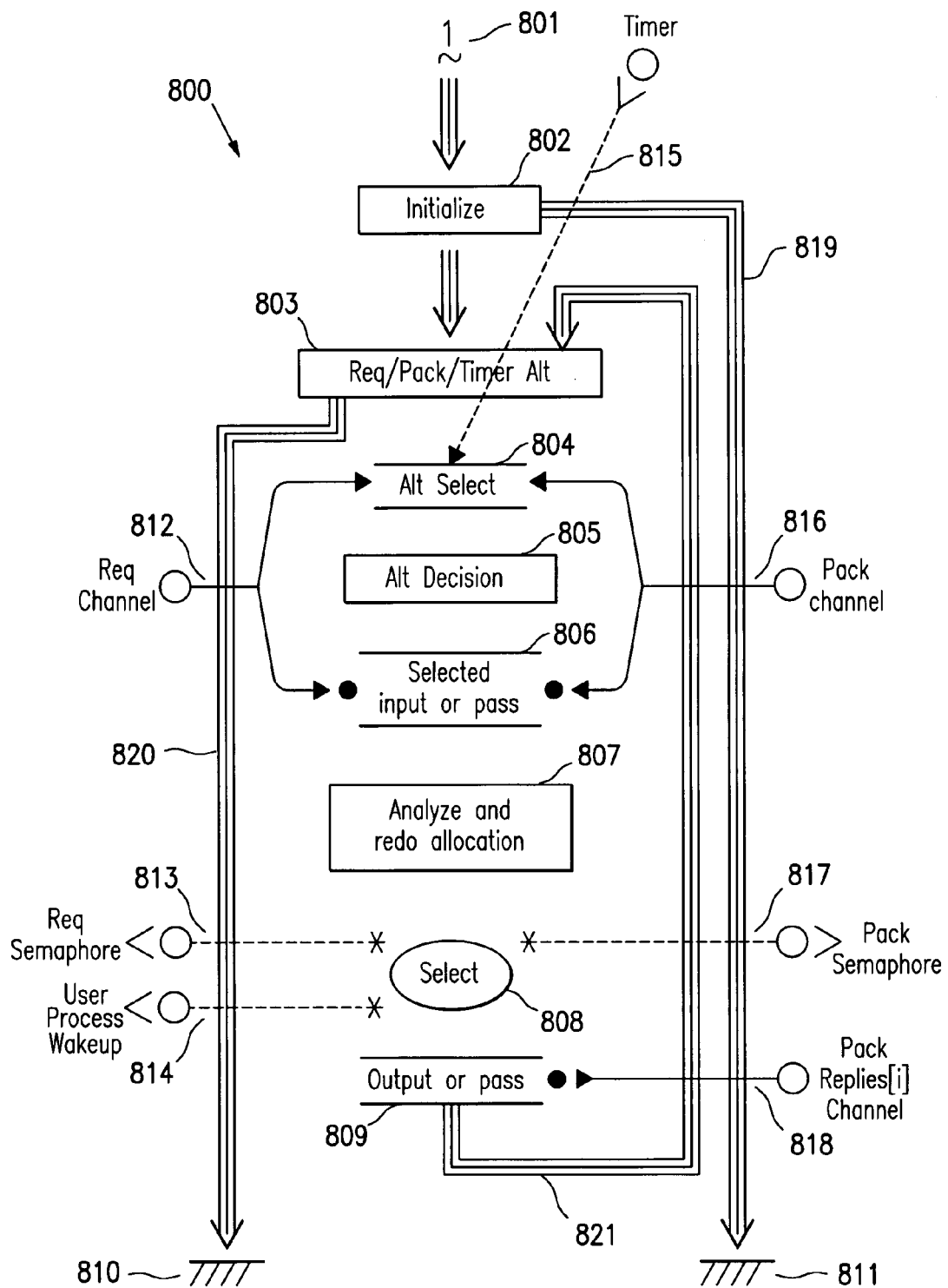
FIG. 8 is a flow diagram illustrating an allocator in the embodiment of FIG. 5.
Figure 9:
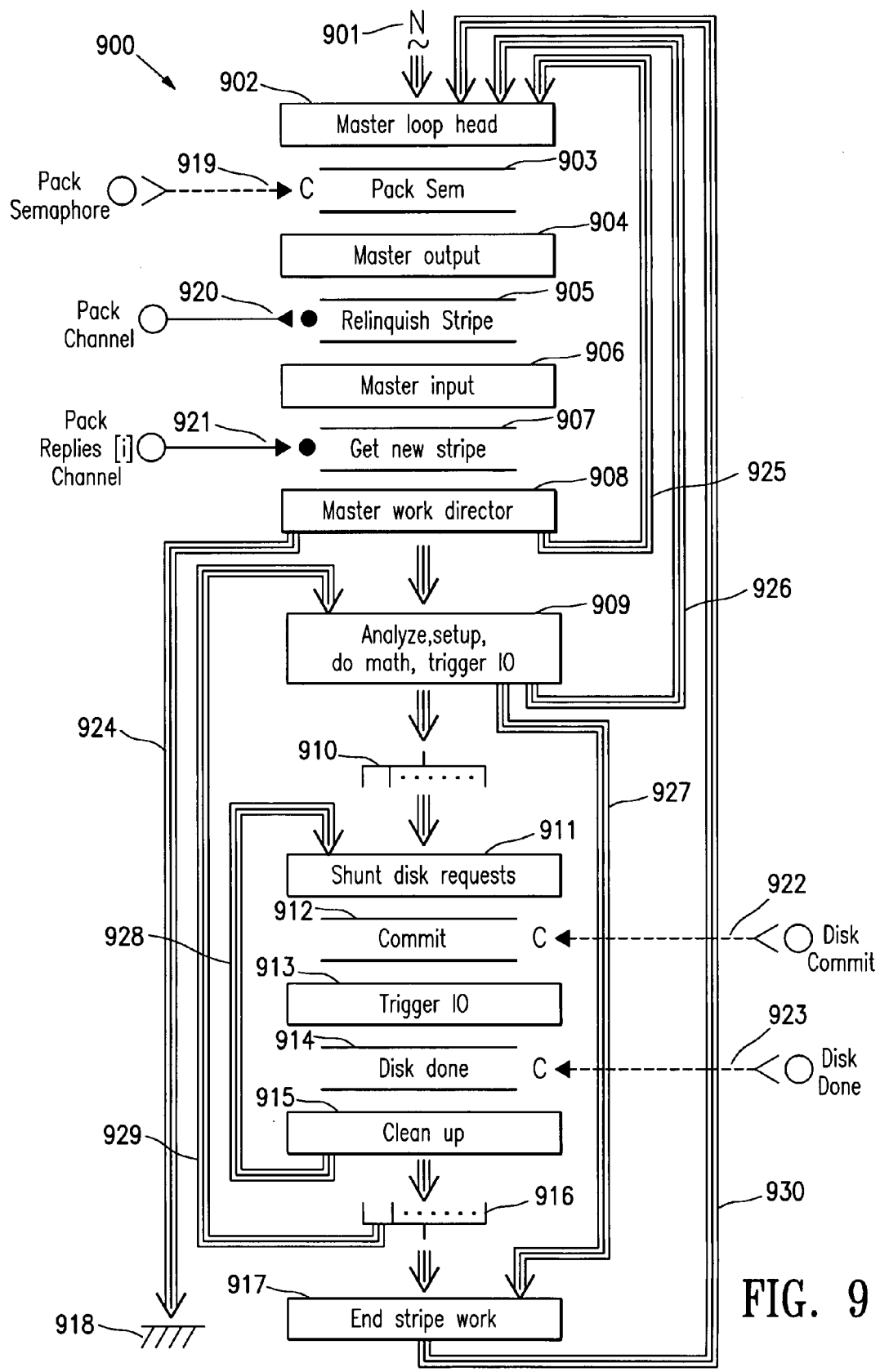
FIG. 9 is a flow diagram illustrating a stripe master in the embodiment of FIG. 5.

Using the legend shown in FIG. 6, the program flow diagrams FIGS. 7-9 are explained below. FIGS. 7, 8 and 9 illustrate examples of a requester, an allocator, and a stripe master, respectively, such as components 51, 52 and 53 shown in FIG. 5. Referring to FIG. 7, copies of requesters 700 may be dynamically created (symbol 701). Hundreds or thousands of copies may exist. Requesters are spawned and disappear at the behest of user processes, which are higher level external wakeup clients.

First, an "await semaphore" code block 702 is executed, which puts the requester in a state 703 where the requester waits for a Req Semaphore 707. This is implemented by placing an entry in a condition queue maintained by the allocator. The wait state 703 is a condition queue where the condition may be changed by a semaphore. The Req Semaphore 707, issued by the allocator, communicates to the requester 700 that the latter is in possession of the Req Channel 708. While multiple requesters typically exist in the RAID core, only one of them can be in possession of the Req Channel at any given time. Thus, by using the Req Semaphore, the allocator controls which of the many requesters is in possession of the Req Channel at a given time. When a Req Semaphore 707 is received by the requester 700, the requester wakes up and executes the task "place request in queue" 704 ("request" being the request from the user process that spawned the requester), which sends a message through the Req Channel 708 to the allocator which ultimately causes the request to be placed in the proper queue, and ends the requester program. The symbol "OAEP" (705), or "output to alternation and end program", represents the fact that requester program ends after the message is transmitted through the Req Channel 708, regardless of whether the receiver (here the allocator) is ready to receive and handle the message (as described later). It should be clear from the context here that the word "program" refers to a pseudothread. Thus, "requester program" is a requester pseudothread, and "end program" refers to ending the pseudothread rather than the entire RAID core program. The same meaning is understood elsewhere in the disclosure whenever the context is clear.

In FIG. 7 as well as FIGS. 8, 9, 11 and 12, the type of symbol like 702 and 704 (see symbol 65a in FIG. 6(b)) represents a non-blocking task, and the type of symbol like 703 and 705 (see symbol 65b in FIG. 6(b)) represent a state of wait, branch, selection or pass that exist between two tasks (as in the case for symbol 703) or after a pseudothread has disappeared (as in the case for symbol 705).

In the flow diagrams of FIGS. 7-9, 11 and 12, the edge symbols 63a, 63b and 63c are used to indicate communication between two programs and serve to connect two flow diagrams together. For example, the Req Channel symbol 708 in the requester (FIG. 7) and the Req Channel symbol 812 in the allocator (FIG. 8) together represent a channel from the requester to the allocator. Similarly, the Req Semaphore symbol 707 in requester (FIG. 7) and the Req Semaphore symbol 813 in the allocator (FIG. 8) together represent a semaphore sent from the allocator to the requester.

The allocator 800 is described with reference to FIG. 8. The essence of the allocator design is just-in-time response. It provides for communications with the requester and the stripe masters, and facilitates just-in-time response to the requester and stripe masters.

The edge symbols Req Channel 812 and Req Semaphore 813 connect the allocator with the requester as explained earlier. The edge symbols Pack Channel 816, Pack Semaphore 817, and Pack Replies [i] Channel 818, together with the corresponding edge symbols 920, 919 and 921 in FIG. 9, connect the allocator with the stripe masters 900 in FIG. 9 to provide communication therebetween. A "pack" is a pack of requests, such as a plurality of read requests for reading data in the same disk area within the same stripe. The allocator submits a pack of requests to stripe masters through Pack Replies [i] Channels 818. A plurality of Pack Replies [i] Channels may be present, one for each stripe master. A stripe master 900 communicates a ready signal to the allocator through the Pack Channel 816 when an assigned pack of requests is done. The Pack Semaphore 817 controls the possession of the Pack Channel by the multiple stripe masters, in a similar fashion as the Req Semaphore 813, 707 controls the possession of the Req Channel 812, 708 by the multiple requesters.

As indicated by symbol 801, one copy of the allocator program is created in the RAID core. After initialization (step 802), the code block "Req/Pack/timer Alt" 803 is executed to put the allocator 800 in the "Alt select" state 804. "Alt" stands for alternation, which is a select. In "Alt select" 804, the allocator program waits on input, and wakes up at inputs from one of three sources: a ready signal from a requester through the Req Channel 812, a ready signal from a stripe master through the Pack Channel 816, and a timeout signal from a timer 815. The timer 815 is a lower level (interrupt level) condition queue handler, and functions to wake up the allocator from time to time even if no other inputs are received. If multiple inputs from different sources arrive at the "Alt select" state 804 in close proximity, all will be registered with the allocator. The code block "Alt decision" 805 is executed, and the allocator selects (in state 806) one of the inputs to receive communication from. In the case when more than one input is registered, the selection among them is according to a predetermined priority. When only a timer 815 input is received, "pass" is selected and no communication from a channel takes place. The Req Channel symbol 812 and the Pack Channel symbol 816 shown in FIG. 8 each has two arms; the upper arm (ending with an arrow, see symbol 66f in FIG. 6(b)) indicates a ready signal for the "Alt select" 804, while the lower arm (ending with an arrow and a filled-in circle, see symbol 66c in FIG. 6(b)) indicates a data communication.

The control then passes to "analyze and redo allocation" block 807 which performs the necessary actions to respond to the changes in conditions. For example, if the Req Channel 812 is selected, the allocator will respond to the request that is made. Another example is when a ready signal is received from a stripe master through the Pack Channel 816, the allocator analyzes the request queue, and if the requests at the head of the request queue are in a "done" state, the allocator will send a user process wakeup signal (814) to notify the user process that submitted the requests. The "analyze and redo allocation" code block 807 thus represents the majority of the substantive processing of the allocator. This code block may need to be executed multiple times in response to a single channel communication. To facilitate this, the timer 815 can be set to "immediate" to act as a skip. This wakes up the allocator immediately in step 804 of the next loop through, and the allocator will select (step 806) the "immediate" timer if no communication is pending. As a result, the "analyze and redo allocation" code block 807 can be executed multiple times before the allocator goes to sleep if no channel is ready.

Based on the result of the "analyze and redo allocation" block 807, the allocator may perform one or more of the three actions ("Select" 808): transmitting a Req Semaphore 813 to an appropriate requester (the next in line) giving it possession of the Req Channel 812; transmitting a user process wakeup signal 814 to an outside user process; transmitting a Pack Semaphore 817 to an appropriate stripe master giving it possession of the Pack Channel 816. The allocator then executes the "output or pass" block 809, which either passes, or transmits a signal to the stripe master through a Pack Replies [i] Channel 818 to submit another job to that stripe master. The control then loops back to the "Req/Pack/timer Alt" block 803, and waits for the next input signal.

FIG. 8 also shows a path 819 from the initialization block 802 that ends the program in response to bad initial data. Another path 820 from the "Req/Pack/timer Alt" block 803 ends the program in response to a kill request.

The stripe parity and IO master ("stripe master") is described with reference to FIG. 9. A fixed number of "N" copies (such as several tens of copies) of the master program are started (although FIG. 9 shows a single stripe master). The "master loop head" 902 puts the master in a condition queue of the allocator and waits for a Pack Semaphore (919) to be received from the allocator (step 903). As described earlier, the Pack Semaphore 919 is issued by the allocator and is used to control possession of the Pack Channel 920 by the plurality of stripe masters. When a Pack Semaphore 919 is received, the stripe master executes the "master output" block 904, by which the stripe master sends a signal through the Pack Channel 920 to the allocator to report a pack done ("Relinquish stripe" 905). Except for the first time this block is executed, the stripe master will have finished the IO request at this point. The first time, the stripe master merely notifies the allocator of its existence and readiness to accept work. "Relinquish stripe" refers to the stripe master passing ownership of the strip back to the allocator. A stripe is the minimum unit of coherent data that is self-sufficient in parity and redundancy calculations in a RAID array. A stripe master always operates on a stripe. To avoid race condition, a stripe must be owned by either the allocator or a stripe master at any given time.

A "master input" block 906 is then executed to put the stripe master in a "get new stripe" state 907 where it waits for an input (a new job) from the allocator through the Pack Replies [i] Channel 921. The "master work director" 908 is a code block that directs the flow of control. When no work is to be done, control passes back to the "master loop head" 902 (branch 926). The "master work director" 908 can also end the program in response to a kill request (branch 924). Otherwise, the control passes to the code block "analyze, setup, do math, trigger IO" 909. The do math" part of this block represents a majority of the CPU usage by the stripe master. If error is detected in IO to disks, control passes back to the "master loop head" 902 (branch 926). If no IO to disk is needed (e.g. parity may have been calculated), control passes from "analyze, setup, do math, trigger 10" 909 to the "end stripe work" block 919 (branch 927) and then loops back to the "master loop head", via the normal stripe done loop 930. From the "analyze, setup, do math, trigger 10" block 909, control may also pass to a fan construct 910, by which zero or more child processes are created, each communicating with an underlying device (disk). Only one such child is illustrated in FIG. 9.

The child executes a "shunt disk requests" block 911, which puts the child in a "commit" wait 912 to wait for a disk commit signal from the disk through a condition queue "disk commit" 922. When the disk commit signal is received, indicating that the disk is ready to receive 10 requests, the child submits all its 10 requests and executes a "trigger IO" block 913, and enters a "disk done" wait 914 to wait for a disk done signal from the disk through a condition queue "disk done" 923. Both "disk commit" 922 and "disk done" 923 are lower level (interrupt level) condition queue handlers. After the disk is done, the "clean up" block 915 performs necessary clean up operation for this child. From the "clean up" block 915, control may pass back to the "shunt disk request" block 911 to complete a short loop due to a Read-Modify-Write request or multi-stripe initialization. The steps 911-915 are then performed again. From the "clean up" block 915, control may also pass to an end fan construct 916 through which the child processes return to the parent process. At this point control may pass back to the "analyze, setup, do math, trigger 10" block 909 in a two-pass Read-Modify-Write request. The control may also pass from the end fan construct 916 to the "end stripe work" block 919 and loop back to the "master loop head" 920 to form a normal stripe done loop.

The use of the "disk commit" signal 922 and the "disk done" signal 923 presumes that the disks have the ability to handle multiple requests. The stripe master receives interrupts from the disks, and can work without detail knowledge of the operation of the underlying disk drivers. The RAID core typically has multiple masters each communicating with multiple disks through the child processes created by the fan 910 and end fan 916.

Preferably, all of the stripe master is executed with low priority except for the disk services part between the fan 910 and the end fan 916. All other pseudothreads in the RAID core are preferably executed with high priority. Further, on a multiprocessor machine, the multiple copies of stripe masters may be assigned to multiple CPUs.

Figure 10:
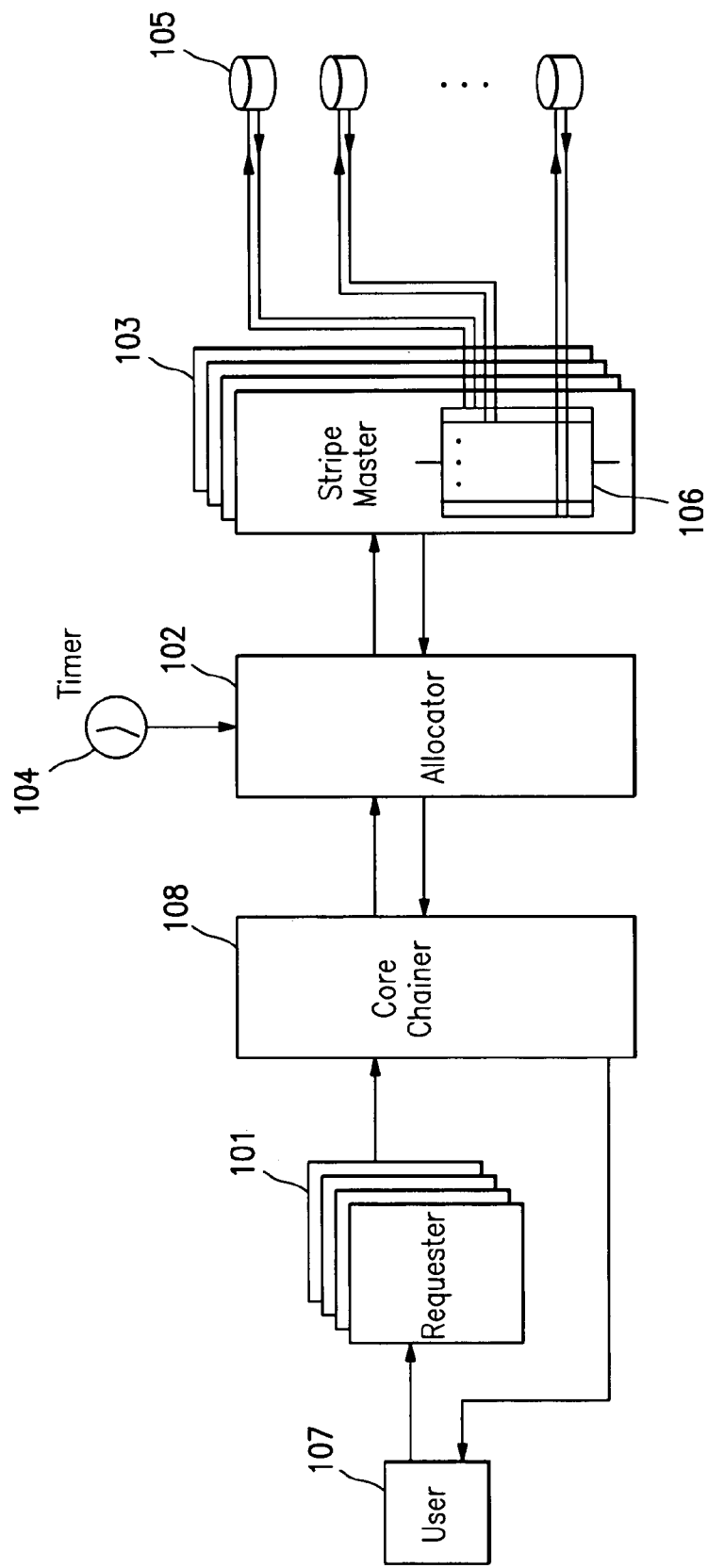
FIG. 10 illustrates the structure of a software core for controlling a RAID according to an alternative embodiment of the present invention.

A conversion-capable RAID core according to an alternative embodiment of the present invention is now described with reference to in FIGS. 10-12. "Conversion-capable"

refers to the ability to convert between different RAID algorithms without stopping user 10 during conversion. This may also be referred to as dynamic conversion. The general structure of this alternative embodiment, as shown in FIG. 10, is similar to the embodiment of FIG. 5 (where like components in FIGS. 5 and 10 are indicated by like reference symbols), except for the addition of a core chainer 108, a pseudothread lying in the data flow between the allocator 102 and the requesters 101. The allocator 102 and its external communication on the requester side are also different from the allocator 52 in FIG. 5. The basic processing functions of the core chainer 108 include receiving multiple requests from requesters 101 and producing a single request to the allocator 102, and/or receiving a single request from a requester 101 and producing multiple requests to the allocator 102. A main purpose of the core chainer is to facilitate dynamic conversion between different RAIDs, by breaking and/or combining requests into local requests which fall efficiently on the stripes of the RAID algorithm operating at that time in the virtual data area of the local requests. The allocator in return communicates progress of conversion to the core chainer, permitting different stripe sizes on either side of the moving conversion watermark without interruption of user IO.

There are two major requirements for conversion. First, the conversion process, operating on a number of stripes at or near a conversion progress point or watermark, must never interfere or cause data validity races with IO at or near the same point. Second, the change in stripe structure caused by conversion must be supported correctly by incoming requests which are always required to be within a single stripe.

The core chainer 108 supports both these requirements, and adds to RAID efficiency, by maintaining its own queue of incoming requests which are analyzed, merged, or broken up to provide local requests capable of efficient handling by the allocator 102 and stripe masters 103. The allocator 102 thus receives "local requests" from the core chainer 108 instead of raw user "requests" from the requesters 101. Therefore, instead of directly performing "user process wakeup" on its own, the allocator 102 sends channel responses to the core chainer 108, which thus keeps track of what is done and handles the "user process wakeup" itself. A channel response sent by the allocator 102 can cause zero, one, or many user process wakeups. Finally, the allocator 102 transmits requests for conversion steps to the core chainer 108, which empties its queues before notifying the allocator that the conversion step is permitted. The core chainer 108 can then use the new watermark, in confidence that the allocator 102 will not permit any subsequent local requests to interfere with the area under conversion until that conversion has reached the new watermark.

Another modification is that the handling of the controlling Req Semaphore, which allows the several requests to use the single Req Channel in sequence, is moved from the allocator 102 to the core chainer 108. In the RAID core embodiment shown in FIG. 5, the allocator 52 communicates directly from many requesters 51. In the alternative RAID core embodiment shown in FIG. 10, the allocator 102 communicates with the core chainer 108, which communication does not require a semaphore. The core chainer 108 communicates with many requesters 101, and therefore needs the Req Semaphore.

Figure 11:
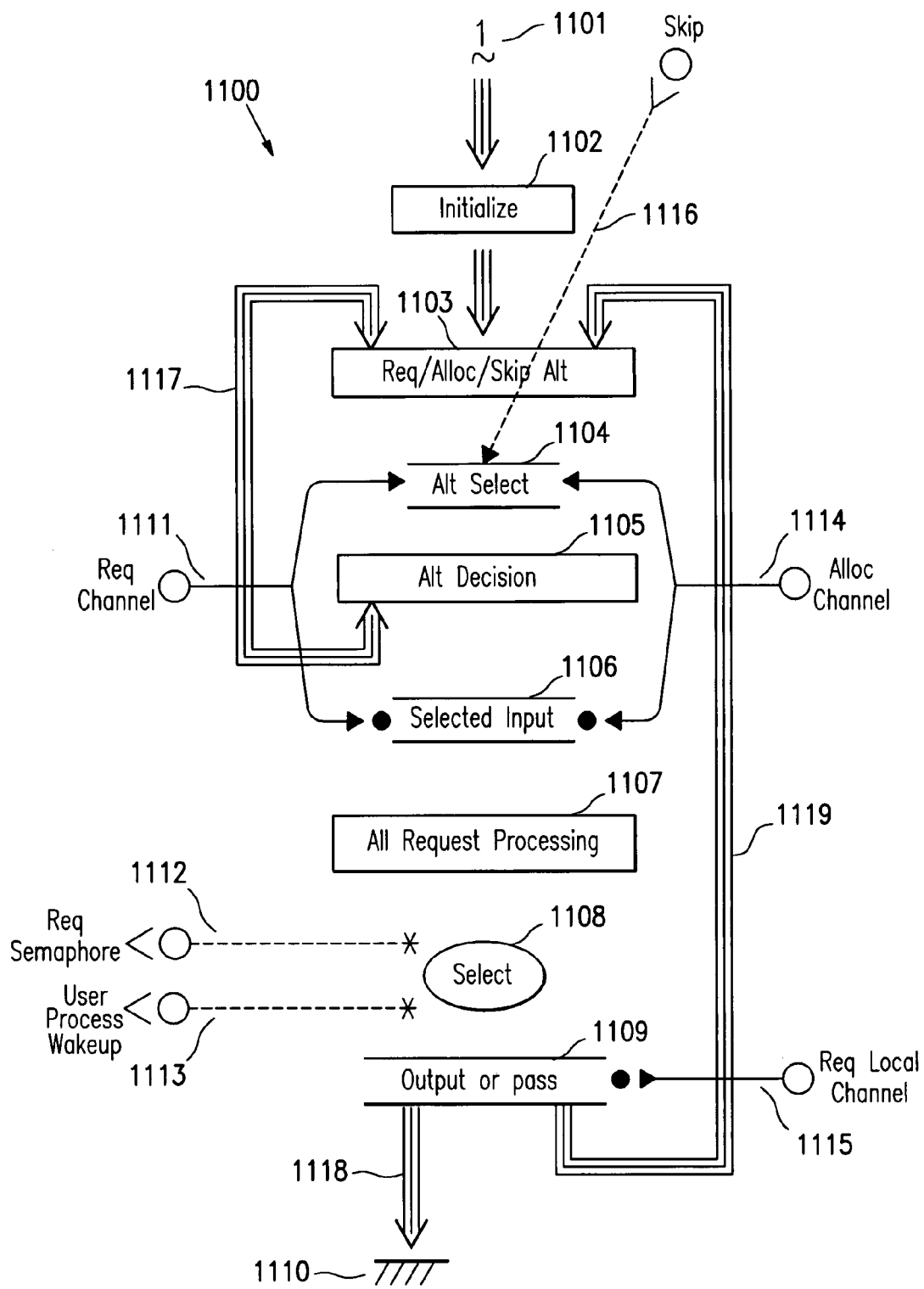
FIG. 11 is a flow diagram illustrating a core chainer in the alternative embodiment of FIG. 10.
Figure 12:
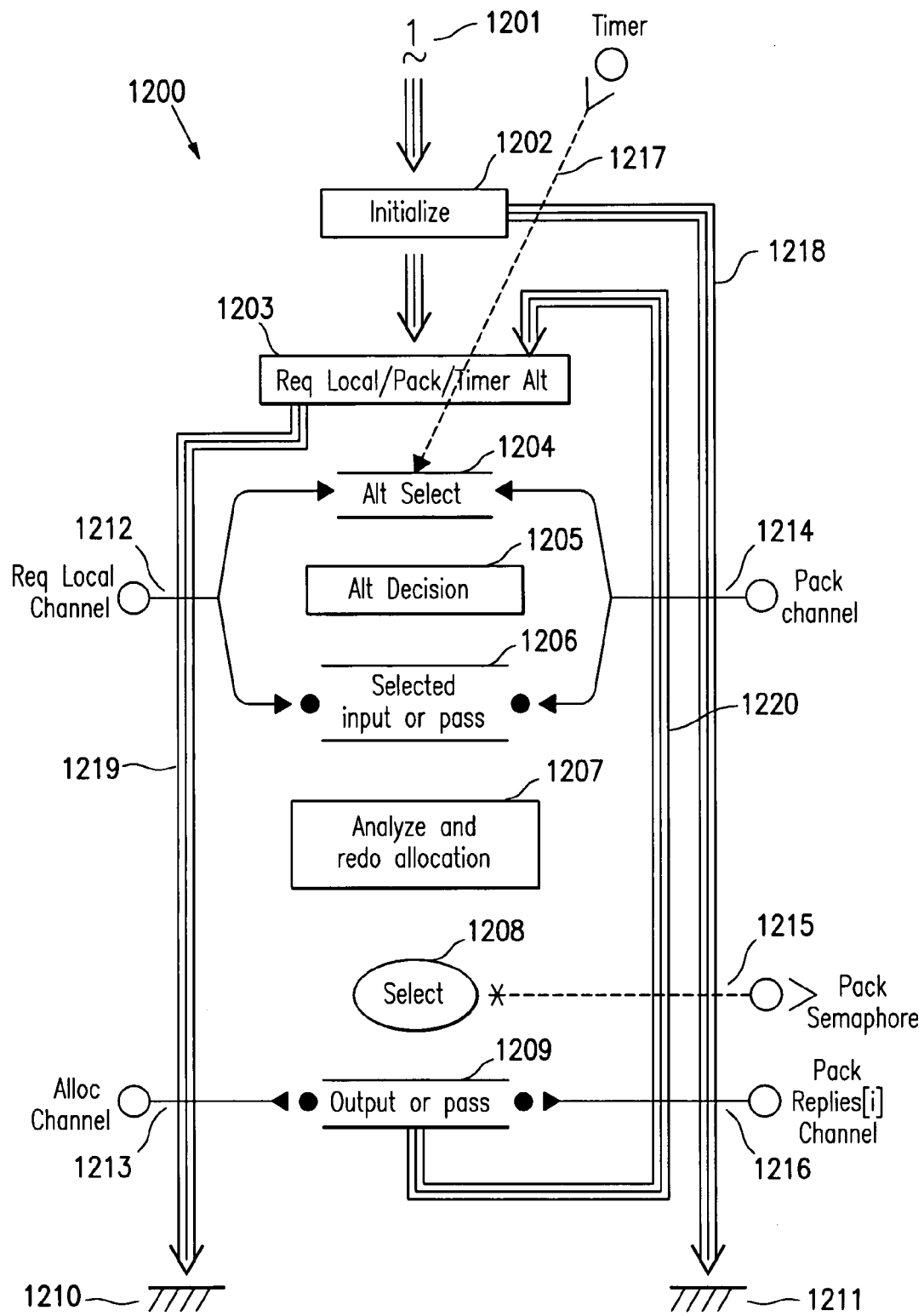
FIG. 12 is a flow diagram illustrating an allocator in the alternative embodiment of FIG. 10.

FIGS. 11 and 12 illustrate the core chainer 1100 and allocator 1200 according to the alternative embodiment. The core chainer 1100 may be connected on its left to requesters shown in FIG. 7, and on its right to the allocator 1200; the allocator may be connected on its right to stripe masters 900 shown in FIG. 9.

Referring to FIG. 11, as indicated by the symbol 1101, one copy of the core chainer is created in the RAID core. The edge symbols on the left hand side, namely "Req Channel" 1111, "Req Semaphore" 1112, and "User Process Wakeup" 1113, are functionally and structurally similar to the corresponding elements in the allocator 800 shown in FIG. 8, namely "Req Channel" 812, "Req Semaphore" 813 and "User Process Wakeup" 814. The "Req Channel" 1111 and "Req Semaphore" 1112 serve to communicate with the requesters 700 shown in FIG. 7. These elements are not described in further detail.

The structure of the core chainer 1100 is similar to that of the allocator 800, where components 1103, 1104, 1105, 1106, 1107, 1108 and 1109 in the core chainer 1100 (FIG. 11) correspond to components 803, 804, 805, 806, 807, 808 and 809 of the allocator 800 (FIG. 8). Only the differences between the core chainer 1100 and the allocator 800 are described below. First, a skip 1116 in the core chainer 1100 replaces the timer 815 in the allocator 800. When enabled (i.e. always ready), the skip 1116 causes the core chainer to continue to loop via the skip path 1117 until all inputs from the requesters and the allocator are handled. When all inputs have been handled, the skip is selected (the skip being of the lowest priority in the "Alt select" 1104), and the skip is disabled. As a result of disabling the skip, the core chainer will not continue to loop but will wake up upon receiving an input. The skip 1116 is analogous to a timeout that is always ready. It is illustrated in a fashion similar to the timer 815, even though the skip is not an external stimulus.

Second, the "Alloc Channel" 1114 in the core chainer replaces the "Pack Channel" 816 in the allocator 800. Third, instead of "analyze and redo allocation" block 807 in the allocator 800, the core chainer has a code block "all request processing" 1107 which performs the majority of the processing of the core chainer, including processing related to RAID conversion. Fourth, the "select" state 1108 does not transmit any semaphore to the allocator, since there is only one allocator and one chainer. Fifth, instead of a plurality of "Pack Replies [i] Channels" 818 which the allocator 800 uses to communicate with the plurality of stripe masters, the core chainer uses one "ReqLocal Channel" 1115 to communicate with the allocator 1200 (described later). Lastly, the response to kill requests is different in the core chainer 1100 and the allocator 800. The core chainer ends the program from the "output or pass" block 1109 via path 1119. The path 1119 in the core chainer completes a normal loop (similar to the path 821 in the allocator 800).

The allocator 1200 for the alternative embodiment is illustrated in FIG. 12. The edge symbols on the right hand side, namely "Pack Channel" 1214, "Pack Semaphore" 1215, and "Pack Replies [i] Channel" 1216 are functionally and structurally similar to the corresponding elements in the allocator 800 shown in FIG. 8, namely "Pack Channel" 816, "Pack Semaphore" 817, and "Pack Replies [i] Channel" 818. The edge symbols on the left hand side of the allocator 1200, namely "ReqLocal Channel" 1212 and "Alloc Channel" 1213 communicate with the core chainer 1100.

The structure of the allocator 1200 is similar to that of the allocator 8Q0 of the embodiment shown in FIG. 8, where components 1203, 1204, 1205, 1206, 1207, 1208 and 1209 in the allocator 1200 (FIG. 11) correspond to components 803, 804, 805, 806, 807, 808 and 809 of the allocator 800 (FIG. 8). Only the differences between the allocator 1200 and the allocator 800 are described below. First, the "ReqLocal Channel" 1212 replaces the Req Channel" 812. Second, the "Select" state does not transmit any semaphore to the core chainer 1100 because control of possession of the "ReqLocal Channel" 1212 is not necessary. Third, instead of "User process wakeup" 814, the allocator 1200 transmits a ready signal to the core chainer 1100 via the "Alloc Channel" 1213.

Program code that exemplifies portions of a RAID core program embodying the present invention is included in Appendix A contained on a compact disc that has been incorporated by reference.

As described above, the RAID core is implemented in pseudothreads and requires the system to have a capability to support pseudothreads having properties described earlier in this disclosure. Alternatively, the RAID core can be implemented in a conventional operating system having a thread capability. In such an implementation, the various components including the requesters, the resource allocator, the core chainer, and the stripe parity and IO masters may be constructed with standard operating-system-dependent "threads" communicating through "pipes" and standard shared memory. In this sense, the invention is a software core for a RAID application having the main components described above (requesters, allocator, core chainer and stripe parity and IO masters), implemented using appropriate programming techniques. The implementation using conventional thread structure, however, is less efficient and less flexible than the implementation using pseudothreads. For example, if the "fan" and "end fan" constructs for the stripe-masters is substituted with a conventional "thread spawning" system, it would be constrained by the difficulty of orderly termination of the fan.

An operating-system-independent modular programming method has been described. Embodiments of this invention may be practiced in various forms, such a programming method that is practiced in developing software products; software products so developed, in the form of a computer-usable medium carrying programs developed using the programming method; a computer storing and executing such programs; a method performed by a computer according to such programs, etc. Here, computer-usable medium may include floppy disks, optical disks, a computer network, or a carrier wave transmitted by wireless means, etc. that is used to distribute or transmit program code. Also, the term "software" as used here includes what may sometimes be referred to as "firmware".

It will be apparent to those skilled in the art that various modification and variations can be made in the method of the present invention without departing from the spirit or scope of the invention. Thus, it is intended that the present invention cover modifications and variations that come within the scope of the appended claims and their equivalents.

What is claimed is:

1. A computer readable storage medium carrying computer program code, the computer program code comprising:

program code that implements one or more tasks, each task being a program that is run in sequence by being branched to from code outside it and branching to code outside it after it ends;

program code that implements one or more task queues, each task queue comprising a task queue program and a first queue containing zero or more tasks, wherein the task queue program is run by being branched to from code outside it to its beginning, wherein if the first queue contains at least one task, the task queue program runs the first task in the first queue and removes that task from the first queue, and wherein if the first queue contains no tasks, the task queue program ends by branching to code outside it;

program code that implements zero or more condition queues, each condition queue comprising a condition queue program and a second queue containing zero or more tasks and associated conditions, wherein the condition queue program is run by being branched to from code outside it, wherein if the second queue contains at least one task and the associated condition, the condition queue program determines the validity of the conditions associated with the tasks in order, wherein if the condition is true, the condition queue program removes the task from the condition queue and places the task in a task queue, and wherein if the second queue contains no tasks, the condition queue program ends by branching to code outside it;

wherein at least one of the tasks in one of the task queues includes task ending code that refers to a successor task, wherein running the task ending code causes the successor task to be run or placed in one of the task queues or one of the condition queues, and program code that implements a fan construct, the fan construct being a portion of a parent task that references zero or more child tasks, the fan construct including a parent-global fan end counter and a parent-global fan end task, wherein the parent task either runs the code of each child task or places the child task in a task queue, wherein each child task references zero or more successor tasks to form a child sequence, and wherein the parent-global fan end counter indicates the number of child sequences not yet completed; and program code that implements an end fan component in the last task of each child sequence, the end fan component decrementing the parent-global fan end counter, the end fan component further evaluating the parent-global fan end counter and placing the parent-global fan end task in a task queue if the parent-global fan end counter indicates that all child tasks have been completed.

2. The computer readable storage medium of claim 1, wherein a sequence of tasks continuing in sequence through successor tasks or through fans and the corresponding end fan components form a pseudothread.

3. The computer readable storage medium of claim 2, the computer program code further comprising:

program code that implements a first pseudothread;

program code that implements a second pseudothread; and program code that implements a condition queue holding a workspace pointer which is either a workspace address for a task or is NULL;

wherein the first pseudothread communicates with the second pseudothread by testing the condition queue.

4. The computer readable storage medium of claim 2, wherein the task maintains state and communication parameters in a workspace structure, wherein the condition queue comprises a workspace pointer which is either a workspace address for a task or is NULL, wherein condition is tested either within another task which maintains state and communication parameters in a workspace structure, or by external code driven by a device which maintains state, and the condition consists of a test whether the workspace pointer of the condition queue is a nonNULL workspace address, wherein if the workspace pointer is a nonNULL workspace address, the testing task or external code changes the state or performs communication according to the communication parameters, and/or places either the testing task, or the task pointed to by the workspace pointed to by the workspace address pointer, in the condition queue or in one of the task queues, and wherein if the workspace pointer is NULL, the testing task adjusts the state of the testing task and places the testing task's workspace pointer in the condition queue, or the external code adjusts the state of the device that is driving the external code.

5. The computer readable storage medium of claim 1, wherein code in the end fan component that decrements the parent-global fan end counter, evaluates the parent-global fan end counter and places the parent-global fan end task in a task queue is atomic code.

6. The computer readable storage medium of claim 1, wherein code in the task queue program that determines whether the first queue is empty is atomic code.

7. The computer readable storage medium of claim 1, wherein code in the condition queue program that determines the validity of the condition associated with each task in order and that removes the task from the condition queue and places it in one of the task queues is atomic code.

8. The computer readable storage medium of claim 1, wherein the condition queue is ordered and when the condition associated with a task in the second queue is determined to be invalid, the condition queue program ends.

9. The computer readable storage medium of claim 1, wherein the condition queue is non-ordered and when the condition associated with a task in the second queue is determined to be invalid, the condition queue program determines the condition associated with the next task in the second queue until the conditions associated with all tasks in the second queue have been determined.

10. A method performed by a programmed computer, further comprising:
running one or more task queue programs, each task queue program being associated with a task queue containing zero or more tasks, wherein the running of the task queue program includes running a first task in the task queue and removing that task from the task queue if the task queue contains at least one task, and ending the task queue program if the task queue contains no tasks:
running zero or more condition queue programs, each condition queue program being associated with a condition queue containing zero or more tasks and associated conditions, wherein the running of the condition queue program includes determining the validity of the conditions in the condition queue in order if the condition queue contains at least one task and the associated condition, and if the condition is true, removing the task from the condition queue and placing the task in one of the task queues, and if the condition queue contains no tasks, ending the condition queue program;
wherein at least one of the tasks in one of the task queues includes task ending code that refers to a successor task, wherein running the task ending code causes the successor task to be run or placed in one of the task queues or one of the condition queues,
creating a fan by running a fan construct, the fan construct being a portion of a parent task that references zero or more child tasks, the fan construct including a parent-global fan end counter and a parent-global fan end task, wherein the parent task either runs the code of each child task or places each child task in a task queue, wherein each child task references zero or more successor tasks to form a child sequence, and wherein the parent-global fan end counter indicates the number of child sequences not yet completed; and
ending a fan by running an end fan component in the last task of each child sequence, the end fan component decrementing the parent-global fan end counter, the end fan component further evaluating the parent-global fan end counter and placing the parent-global fan end task in a task queue if the parent-global fan end counter indicates that all child tasks have been completed.

11. The method of claim 10, wherein a sequence of tasks continuing in sequence through successor tasks or through fans and the corresponding end fan components form a pseudothread.

12. The method of claim 11, further comprising:
running a first pseudothread;
running a second pseudothread; and
running a condition queue holding a workspace pointer which is either a workspace address for a task or is NULL;
wherein the first pseudothread communicates with the second pseudothread by testing the condition queue.

13. The method of claim 11,
wherein the task maintains state and communication parameters in a workspace structure,
wherein the condition queue comprises a workspace pointer which is either a workspace address for a task or is NULL,
wherein condition is tested either within another task which maintains state and communication parameters in a workspace structure, or by external code driven by a device which maintains state, and the condition consists of a test whether the workspace pointer of the condition queue is a nonNULL workspace address,
wherein if the workspace pointer is a nonNULL workspace address, the testing task or external code changes the state or performs communication according to the communication parameters, and/or places either the testing task, or the task pointed to by the workspace pointed to by the workspace address pointer, in the condition queue or in one of the task queues, and
wherein if the workspace pointer is NULL, the testing task adjusts the state of the testing task and places the testing task's workspace pointer in the condition queue, or the external code adjusts the state of the device that is driving the external code.

14. A method performed by a programmed computer for controlling a RAID storage system using the method of claim 11, the RAID system including a plurality of storage devices, the method comprising:
running one or more requesters by driver calls from one or more users, each requester being a first pseudothread;
running a resource allocator, the resource allocator being a second pseudothread; and
running one or more stripe parity and IO masters, each stripe parity and IO master containing a parent pseudothread and zero or more child pseudothreads, each child pseudothread communicating with one storage device,
wherein the one or more requesters, the resource allocator and the stripe parity and IO masters communicate with each other via communication channels which are condition queues,
wherein each requester transmits a request for input or output from a user to the resource allocator,
wherein the resource allocator is responsive to communications from the requesters, the stripe parity and IO masters, and a timer, accepts requests for input and output from the requesters, communicates with the stripe parity and IO masters to allocate resources, and transmits state and data to the users, and
wherein each stripe parity and IO master performs parity creation, and/or reading or writing of user data with parity data from or to the plurality of storage devices.

15. A method performed by a programmed computer for controlling a RAID storage system using the method of claim 11, the RAID system including a plurality of storage devices, the method comprising:

running one or more requesters by driver calls from one or more users, each requester being a first pseudothread;

running a chainer, the chainer being a second pseudothread;

running a resource allocator, the resource allocator being a third pseudothread; and running one or more stripe parity and IO masters, each stripe parity and IO master containing a parent pseudothread and zero or more child pseudothreads, each child pseudothread communicating with one storage device, wherein the one or more requesters, the chainer, the resource allocator and the stripe parity and IO masters communicate with each other via communication channels which are condition queues, wherein each requester transmits a request for input or output from a user to the chainer, wherein the chainer receives multiple requests from requesters and produces a single local request to the resource allocator, and/or receives a single request from a requester and produces multiple local requests to the resource allocator, wherein the chainer further transmits state and data to the users in response to channel responses received from the resource allocator, wherein the resource allocator is responsive to communications from the chainer, the stripe parity and IO masters, and a timer, accepts local requests for input and output from the chainer, communicates with the stripe parity and IO masters to allocate resources, and transmits channel responses to the chainer indicating status of local requests, and wherein each stripe parity and IO master performs parity creation, and/or reading or writing of user data with parity data from or to the plurality of storage devices.

16. The method of claim 10, wherein code in the end fan component that decrements the parent-global fan end counter, evaluates the parent-global fan end counter and places the parent-global fan end task in a task queue is run with interrupts and any multiprocessing CPU concurrency disabled.

17. The method of claim 10, wherein code in the task queue program that determines whether the task queue is empty is run with interrupts and any multiprocessing CPU concurrency disabled.

18. The method of claim 10, wherein code in the condition queue program that determines the validity of the condition associated with each task in order and that removes the task from the condition queue and places it in one of the task queues is run with interrupts and any multiprocessing CPU concurrency disabled.

19. The method of claim 10, wherein the condition queue is ordered and when the condition associated with a task in the condition queue is determined to be invalid, the condition queue program ends.

20. The method of claim 10, wherein the condition queue is non-ordered and when the condition associated with a task in the condition queue is determined to be invalid, the condition queue program determines the condition associated with the next task in the condition queue until the conditions associated with all tasks in the condition queue have been determined.

* * * * *